United States Patent
Seguchi

(10) Patent No.: US 8,049,458 B2
(45) Date of Patent: Nov. 1, 2011

(54) FIELD WINDING TYPE OF SYNCHRONOUS ROTARY ELECTRIC MACHINE

(75) Inventor: Masahiro Seguchi, Oobu-shi (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 543 days.

(21) Appl. No.: 12/212,261

(22) Filed: Sep. 17, 2008

(65) Prior Publication Data

US 2009/0072777 A1 Mar. 19, 2009

(30) Foreign Application Priority Data

Sep. 18, 2007 (JP) ................... 2007-241493

(51) Int. Cl.
*H02P 1/46* (2006.01)
(52) U.S. Cl. .................... 318/700; 318/705; 318/432
(58) Field of Classification Search ............ 318/720, 318/721, 705, 700, 714, 715, 400.01, 432, 318/434

See application file for complete search history.

(56) References Cited

U.S. PATENT DOCUMENTS

| | | | |
|---|---|---|---|
| 4,038,589 A | * | 7/1977 | Heyne et al. ............ 318/718 |
| 4,684,875 A | * | 8/1987 | Powell ............ 323/204 |
| 4,707,650 A | * | 11/1987 | Bose ............ 318/685 |
| 2006/0290316 A1 | | 12/2006 | Seguchi et al. |
| 2008/0079375 A1 | | 4/2008 | Seguchi |

FOREIGN PATENT DOCUMENTS

| | | |
|---|---|---|
| JP | H07-095790 | 4/1995 |
| JP | 2007-185082 | 7/2007 |
| JP | 2008-086161 | 4/2008 |
| WO | WO 2007/003868 | 1/2007 |

OTHER PUBLICATIONS

Japanese Office Action dated Sep. 1, 2009, issued in corresponding Japanese Application No. 2007-241493, with English translation.

* cited by examiner

*Primary Examiner* — Rina Duda
(74) *Attorney, Agent, or Firm* — Nixon & Vanderhye PC

(57) ABSTRACT

A speed-variable field winding type of synchronous rotary electric machine is provided, where a rotor with plural-phase windings faces a rotor with a field winding. A field current is limited to flow through the field winding in one direction thereof. A fundamental component of armature current, which corresponds to a synchronizing current for producing a rotating magnetic field rotating in sync with the rotation of the rotor, is supplied to the armature windings. The synchronizing current is adjusted in frequency to change a rotor rotation speed. A pulsed rotor exciting current is supplied to the armature windings. The exciting current causes the field winding to induce the field current only during a specified current-supply duration shorter than a one cycle of the synchronizing current. The number of current-supply times for the exciting current, per electrical angle $2\pi$ and per phase, has a positive correlation with the cycle of the synchronizing current.

11 Claims, 20 Drawing Sheets

FIG.5

FIELD WINDING TYPE OF SYNCHRONOUS ROTARY ELECTRIC MACHINE

CROSS-REFERENCE TO RELATED APPLICATION

This application is based on and claims the benefit of priority from earlier Japanese Patent Application No. 2007-241493 filed Sep. 18, 2007, the description of which is incorporated herein by reference.

BACKGROUND OF THE INVENTION

1. Technical Field of the Invention

The present invention relates to the field winding type of synchronous rotary electric machine, and more particularly, to the improvement of field winding types of synchronous rotary electric machines which perform power supply by passing field current to a field winding (also referred to as "short-circuit winding") from armature winding(s) in a non-contact manner using electromagnetic induction.

2. Related Art

Various types of rotary electric machines are known. As one type of such rotary electric machines, synchronous rotary electric machines are known. Such a synchronous rotary electric machine serves as a rotary electric machine by having its rotor rotated in synchronization with a rotating magnetic field formed by armature current, i.e. alternating current which flows through stator coils. Synchronous rotary electric machines are generally known to possess relatively high efficiency.

Rotors known to be used for such synchronous rotary electric machines include magnet type rotors, field winding type rotors, reluctance type rotors and rotors of the type having mixed properties of the foregoing rotors. The field winding type of synchronous rotary electric machines require neither to install expensive permanent magnets on the rotor cores, nor to consider resistance to centrifugal force of magnets. In addition, the field winding type of synchronous rotary electric machines can easily control torque or generated (induced) voltage by controlling field magnetic flux. Accordingly, the field winding type of synchronous rotary electric machines can exert good practicality when they are used as speed-variable rotary electric machines that generate motive power for vehicles to travel. However, the field winding type of synchronous rotary electric machines have suffered from an issue that they require to install and maintain a brush and slip-ring mechanism in order to supply field current to the field winding.

To address the issue mentioned above, Japanese Patent Laid-Open Publication No. 7-095790, for example, suggests a field winding type of synchronous rotary electric machine which is configured to effect PWM (pulse width modulation) control to armature current to the supply rotor-exciting current to the armature winding, the rotor-exciting current having frequency different from that of the rotor-synchronizing current. As a result, the alternating current induced to the field winding is rectified to serve as field current.

However, in the field current supply method of the type disclosed in this literature, fundamental components of armature current (hereinafter also referred to as "synchronizing current") that synchronizes with the rotation of the rotor are superposed with the rotor exciting current for generating field current. For this reason, the efficiency of using field current corresponding to the amplitude of the fundamental components of the armature current becomes less relative to the amplitude of the DC power voltage. This issue of less efficiency has caused another issue of large torque ripple. Because of these issues, the field current supply method disclosed in the above literature has been prevented from being put into practical use.

To address for the issues mentioned above, Japanese Patent Laid-Open Publication No. 2007-185082 discloses a field winding type of synchronous rotary electric machine using a field current supply method, in which pulsed rotor-exciting current is superposed on the fundamental components of armature current forming the rotating field (hereinafter referred to as "pulsed rotor-exciting current superposing method").

In the pulsed rotor-exciting current superposing method, pulsed rotor-exciting current having a cycle shorter than that of synchronizing current is superposed on the synchronizing current of one phase, for one or more number of times in one cycle of the synchronizing current. The advantage of superposing such pulsed rotor-exciting current is that the pulsed rotor-exciting current can be supplied during a favorable phase period of the synchronizing current of each phase. For example, in the case where the synchronizing current of a certain phase has a large amplitude in the positive direction, the reduction in the efficiency of using the DC power supply can be effectively avoided by passing pulsed rotor-exciting current in the negative direction.

As explained above, the pulsed rotor-exciting current superposing method can easily effect control by using PWM (pulse-width modulation) to control the voltage when supplying rotor-exciting current to three-phase PWM voltage for generating torque. In addition, this method can supply pulsed rotor-exciting current in the direction which is the reverse of the direction for supplying synchronizing current. Accordingly, comparing with a method using the rotor-exciting current having a continuous wave, the pulsed rotor-exciting current superposing method has an advantage of enhancing the efficiency of using DC power supply voltage. For example, in the case where the synchronizing current of a certain phase has large amplitude in the positive direction, the reduction in the efficiency of using DC power supply can be well avoided by supplying the pulsed rotor-exciting current in the negative direction.

However, supplying such pulsed rotor-exciting current has raised an issue that adjusting the required magnetic flux is difficult.

For example, when the duration of time for supplying the pulsed rotor-exciting current is increased, the field current passing through the rotor coils can be increased accordingly. However, the increased duration of time has caused larger strain in the waveform of phase current.

In particular, a speed-variable field winding type of synchronous rotary electric machine, when installed in a hybrid car or electric car, is required to frequently change the rate of rotations (rotation speed). In this case, the duration of time corresponding to one cycle of the synchronizing current in each phase is shortened in inverse proportion to the increase in the rate of rotations. For this reason, in a high-speed rotation region, the duration of time for supplying the pulsed rotor-exciting current having a constant time interval is relatively increased in one cycle of the synchronizing current of each phase. In response to the increase in the duration of time, the field current passing through the rotor coils is unavoidably increased, to also increase torque strain and torque ripple.

On the other hand, in a low-speed rotation region, the duration of time for supplying the pulsed rotor-exciting current having a constant time interval is relatively decreased in one cycle of the synchronizing current of each phase. Thus, in response to the decrease in the duration of time, the field current passing through the rotor coils is unavoidably decreased.

SUMMARY OF THE INVENTION

The present invention has been made in light of the issues described above, and has an object of providing a speed-variable field winding type of synchronous rotary electric machine which is able to supply steady field current to mitigate torque ripple or torque strain, irrespective of the speed change in the speed-variable field winding type of synchronous rotary electric machine.

The present embodiment provides a synchronous rotary electric machine, comprising: a stator in which a plurality of phases of armature windings are wound; a rotor having a rotor core in which a filed winding is wound and being placed to face the stator for rotation; a current limiting element connected in series to the field winding to limit, into one direction, a flow direction of induction AC (alternating current) current induced through the field winding in response to armature current passing through the armature windings so that the field winding is allowed to pass a filed current therethrough along only the one direction; and a current control circuit that comprises means for supplying to the armature windings a fundamental component of the armature current which corresponds a synchronizing current for producing a rotating magnetic field rotating in sync with the rotation of the rotor and adjusting a frequency of the synchronizing current to change a rotation speed (i.e., the rate of rotations, or the number of revolutions) of the rotor, and means for supplying to the armature windings a pulsed rotor exciting current for causing the field winding to induce the field current therethrough only during a specified current-supply duration which is set to be shorter than a one cycle of the synchronizing current. This provides a speed-variable field winding type of synchronous rotary electric machine, on which pulsed rotor-exciting current is superposed.

In the first exemplary embodiment, in particular, the current control circuit is configured to have a positive correlation with the cycle of the synchronizing current (to have a negative correlation with the rate of rotations) to set the number of times for supplying the pulsed rotor-exciting current per electrical angle of "$2\pi$" and per phase of the rotor.

For example, in this exemplary embodiment, when the rate of rotations of the rotor is increased to shorten the duration of time corresponding to one cycle of synchronizing current (electrical angle of "$2\pi$" of the rotor), the number of times for supplying the pulsed rotor-exciting current per phase is reduced accordingly.

Thus, high-speed rotation can be achieved, and in addition, the number of times for supplying the pulsed rotor-exciting current per cycle can be reduced (thinned out). Thus, comparing with the case where the number of times for supplying the pulsed rotor-exciting current per cycle is constant, the increase in the average value of field current can be prevented, which increase would be caused by the increase in the frequency of supplying the pulsed rotor-exciting current. Accordingly, normal average value can be ensured for the field current.

Also, when the rotational speed is lowered to prolong one cycle of synchronizing current, the number of times for supplying the pulsed rotor-exciting current per cycle is increased. Thus, comparing with the case where the number of times for supplying the pulsed rotor-exciting current per cycle is constant, the decrease in the average value of field current can be prevented, which decrease would be caused by the decrease in the frequency of supplying the pulsed rotor-exciting current. Accordingly, a normal average value can be ensured for the field current.

In the second exemplary embodiment, in particular, the current control circuit is configured to adjust the duration of one supply of the pulsed rotor-exciting current per electrical angle of "$2\pi$" and per phase of the rotor in a manner negatively correlated with the rate of rotations.

For example, in this exemplary embodiment, when the rate of rotations of the rotor is increased to shorten the duration of time corresponding to one cycle of synchronizing current (electrical angle of "$2\pi$" of the rotor), the duration of time for supplying the pulsed rotor-exciting current per phase is adapted to be shortened accordingly.

Thus, when the rotational speed is increased to shorten one cycle so of synchronizing current, the duration of time for supplying the pulsed rotor-exciting current per cycle can be shortened. Thus, comparing with the case where the number of times for supplying the pulsed rotor-exciting current per cycle is constant, the increase in the average value of field current can be prevented, which increase would be caused by the increase in the total period of time for supplying the pulsed rotor-exciting current. Accordingly, a normal average value can be ensured for the field current.

Also, when the rotational speed is lowered to prolong one cycle of synchronizing current, the duration of time for supplying the pulsed rotor-exciting current per cycle is increased. Thus, comparing with the case where the number of times for supplying the pulsed rotor-exciting current per cycle is constant, the decrease in the average value of field current can be prevented, which decrease would be caused by the decrease in the total period of time for supplying the pulsed rotor-exciting current. Accordingly, a normal average value can be ensured for the field current.

Preferably, the current control circuit comprises means for suppressing changes in the average field current, which are caused by changes in a duration of the synchronizing current per one cycle, by adjusting the current-supply duration for the pulsed rotor exciting current, when changes in the rotation speed of the rotor is below a predetermined threshold.

Thus, a simple current superposing method can be maintained, in which PWM voltage for generating synchronizing current can be converted to PWM voltage for generating pulsed rotor-exciting current, for every carrier cycle. In addition, when the change in the rate of rotations is small, the average field current variation caused by the change can be suppressed in a favorable manner.

For example, there may be a case where the rotational speed is lowered to prolong one cycle of synchronizing current, to resultantly prolong the cycle of supplying the pulsed rotor-exciting current. In such a case, the duration of time for supplying the pulsed rotor-exciting current may be increased to prevent the average value of the field current from being decreased. Also, there may be a case where the rotational speed is increased to shorten one cycle of synchronizing current, to resultantly shorten the cycle of supplying the pulsed rotor-exciting current. In such a case, the duration of time for supplying the pulsed rotor-exciting current may be decreased to prevent the average value of the field current from being increased.

Specifically, in this mode, the fluctuation in the average value of field current caused by the change in the rate of rotations can be suppressed not only by increasing/decreasing the frequency for supplying the pulsed rotor-exciting current according to the first invention, but also by increasing/decreasing the duration of time for supplying the pulsed rotor-exciting current according to the second invention. Thus, the fluctuation in the average value of field current caused by the change in the rate of rotations can be favorably suppressed. Also, when the change in the rate of rotations is small in this mode, the duration of time for supplying the pulsed rotor-exciting current is ensured to be adjusted, and when the change in the rate of rotations is large, the frequency for supplying the pulsed rotor-exciting current is ensured to be adjusted.

Preferably, when the rate of rotations is decreased, the duration of time for supplying the pulsed rotor-exciting current may be increased within a range that the duration of time for supplying the pulsed rotor-exciting current would not exceed one carrier cycle of the PWM voltage for forming synchronizing current. Thus, the PWM voltage for forming pulsed rotor-exciting current will not be temporally superposed on the PWM voltage for forming synchronizing current, and thus the waveform of the synchronizing current will not be distorted (or altered) by the superposition that would have been caused.

When the rate of rotations is further decreased, it is preferred to increase the number of times for supplying the pulsed rotor-exciting current to be superposed on one cycle of synchronizing current of one phase. The plurality of pulsed rotor-exciting current may be supplied at a plurality of carrier cycles of the PWM voltage of one phase, which are temporally adjacent to each other, or may be supplied at a plurality of carrier cycles which are temporally apart from each other with an interposition of one or more carrier cycles.

Preferably, when the rate of rotations is increased, the duration of time for supplying the pulsed rotor-exciting current is shortened within a range that the duration of time for supplying the pulsed rotor-exciting current would not become shorter than "one carrier cycle×k" ("k" is a constant) of the PWM voltage for forming synchronizing current. Thus, the current supply can be prevented from becoming difficult due to extreme reduction in the duration of the PWM voltage for forming pulsed rotor-exciting current. When the rate of rotations is increased, it may be preferable to thin out (reduce) the number of times for supplying the pulsed rotor-exciting current to be superposed on one cycle of synchronizing current.

It is preferred that the current control circuit comprises means for reducing (thinning out) the number of times of the current supply for the pulsed rotor exciting current, per electrical angle of $2\pi \times n$ of the rotor and per phase, to an amount less than n-times (n≠m, m is the number of phases), when the rotation speed of the rotor exceeds a predetermined threshold.

Thus, the increase in the average field current caused by the increase in the rate of rotations can be compensated. As a result, the current supply control performed by the inverter can be prevented from becoming difficult due to the extremely shortened period for supplying the pulsed rotor-exciting current. Also, the simple current superposing method can be maintained, in which the PWM voltage for generating synchronizing current is converted to the PWM voltage for generating pulsed rotor-exciting current. In addition to that, the increased in the average field current can be favorably suppressed even when the increase in the rate of rotations is large and thus the increase in the average field current is large. For example, it is preferred that the minimum duration of time for supplying the pulsed rotor-exciting current is 20% or more of the carrier cycle of the PWM voltage of the synchronizing current.

It is also preferred that the current control circuit comprises means for setting the number of times of the current supply for the pulsed rotor exciting current, per electrical angle of $2\pi \times n$ of the rotor and per phase, to two times or more, when the rotation speed of the rotor is less than a predetermined threshold.

Thus, the PWM voltage for generating pulsed rotor-exciting current can be prevented from being superposed on the PWM voltage for generating synchronizing current, even when the period for supplying the pulsed rotor-exciting current is prolonged, e.g. even when the period is required to be longer than one carrier cycle. Thus, the strain that would be caused by the superposition can be prevented from being caused in the synchronizing current or torque. For example, the maximum period for supplying the pulsed rotor-exciting current may be 80% or less of the carrier cycle of the PWM voltage of the synchronizing current.

Preferably the current control circuit comprises means for performing the current supply of the pulsed rotor exciting current in a positive direction thereof in sequence phase by phase.

Thus, the pulsed rotor-exciting current in a specific direction can be prevented from concentrating on one phase, whereby the unbalance or offset can be reduced in the three-phase armature current.

Still preferably, the current control circuit comprises means for performing the current supply of the pulsed rotor exciting current in sequence phase by phase and reversing a current supply direction of the pulsed rotor exciting current to be supplied to each phase every current supply.

Thus, the unbalance or offset in the armature current of each phase, i.e. the phase current of each phase, can be favorably reduced.

Further, the current control circuit may comprise means for controlling a current supply cycle of the pulsed rotor exciting current within a specified time period.

For example, the certain period of time to be maintained may correspond to 10 to 90%, or desirably 20 to 80%, of one carrier cycle of the PWM voltage for forming the synchronizing current. Thus, the torque strain can be mitigated.

The current control circuit may comprise means for performing one time of current supply of the pulsed rotor exciting current within a time period defined by a cycle of a carrier signal of a PWM voltage for generating the synchronizing current.

Thus, the pulsed rotor-exciting current can be adjusted by adjusting the pulse width of one carrier cycle of the PWM voltage, and hence the circuit configuration can be prominently simplified. Also, as has already been described, the PWM voltage for forming the pulsed rotor-exciting current is ensured not to be temporally superposed on the PWM voltage for forming the synchronizing current, and hence the waveform of the synchronizing current can be prevented from being distorted by the superposition that would have been caused.

BRIEF DESCRIPTION OF THE DRAWINGS

In the accompanying drawings:

FIG. 5 is a diagram illustrating modes for supplying pulsed rotor-exciting current;

DETAILED DESCRIPTION OF THE PREFERRED EMBODIMENTS

With reference to the accompanying drawings, hereinafter is described in detail an embodiment of a field winding type of synchronous rotary electric machine of the present invention.

Figure 1:
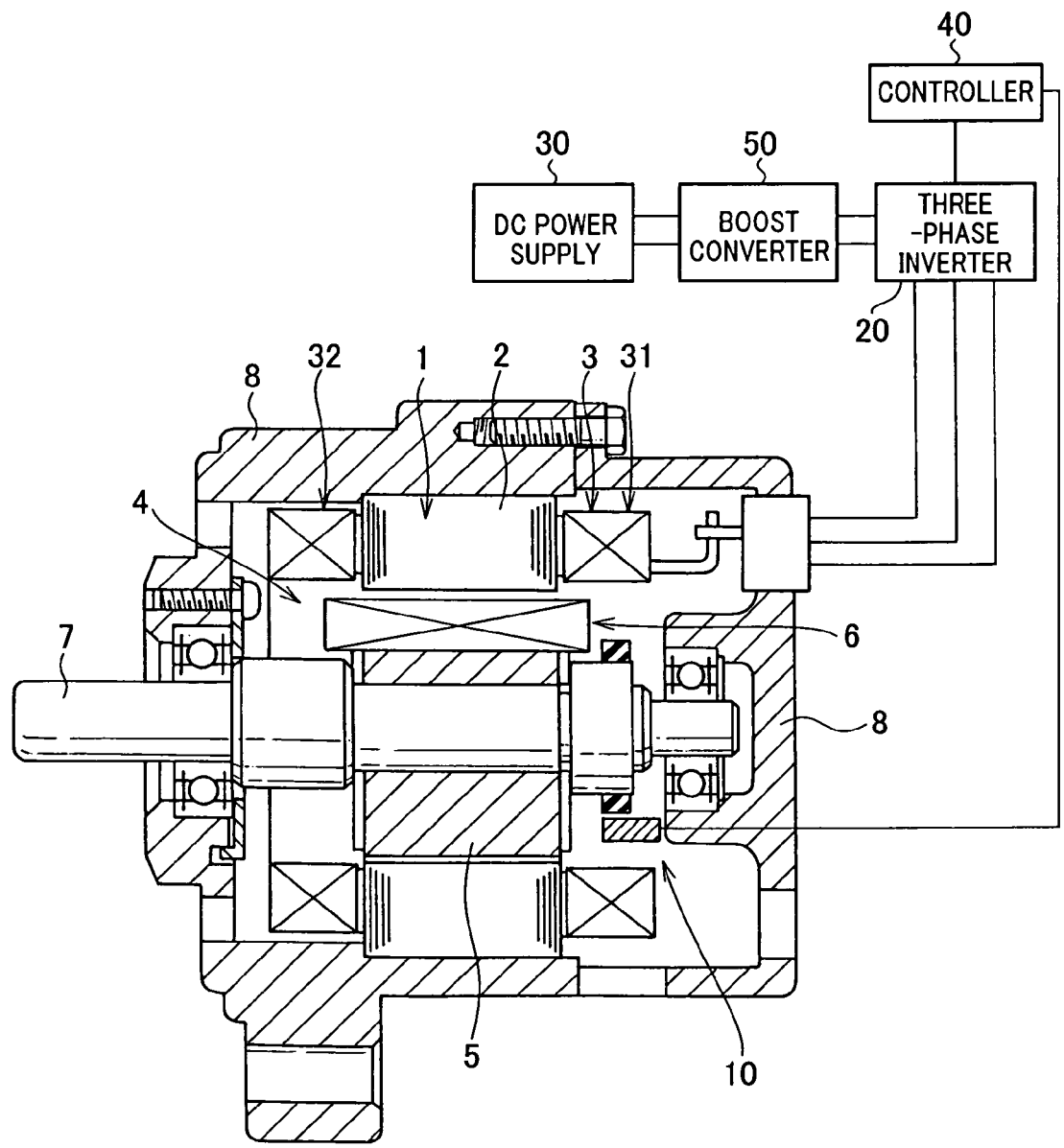
FIG. 1 is a schematic axial cross section illustrating a speed-variable field winding type of synchronous rotary electric machine according to an embodiment of the present invention.

Referring to FIG. 1, the field winding type of synchronous rotary electric machine of the present embodiment is described. This synchronous rotary electric machine is used as a traveling motor in a hybrid car, a fuel cell car or an electric car, for example.

In FIG. 1, the field winding type of synchronous rotary electric machine of the present embodiment includes as its components a stator 1, a stator core 2, stator coils (armature winding) 3, a rotor 4, a rotor core 5, rotor coils (field winding) 6 wound about the rotor core 5, a rotor shaft (rotary shaft) 7 and a frame 8. The stator coils 3 are wound about the stator core 2 to establish a three-phase star connection. The frame 8 fixedly supports the stator 1 and at the same time rotatably supports the rotor 4.

The field winding type of synchronous rotary electric machine also includes as other components a position sensor 10, a three-phase inverter 20, a DC power supply 30, a controller 40 and a boost converter 50.

The position sensor 10 is adapted to detect the rotational position of the rotor 4. In particular, the position sensor 10 is disposed facing an outer peripheral surface of an annular magnetic disk which is fixed to the rotor shaft 7 with magnetic salient poles being formed in the circumferential direction at a constant pitch. Thus, the position sensor 10 can detect a rotational position of the rotor 4 by detecting passage of the magnetic salient poles. The three-phase inverter 20 is configured to control the armature current of the stator coils 3 based on the signals from the position sensor 10 and the controller 40. The DC power supply 30 serves as a device for supplying power required for the inverter 20.

In FIG. 1, indicated by 31 are coil ends of the stator coils 3. The stator coils 3 may have distributed or concentrated winding.

The controller 40 intermittently controls the inverter 20 so that the armature current corresponding to the rotational position of the rotor 4r which position has been obtained from the position sensor 20, can be supplied to the stator coils 3.

(Configuration of Rotor)

Figure 2:
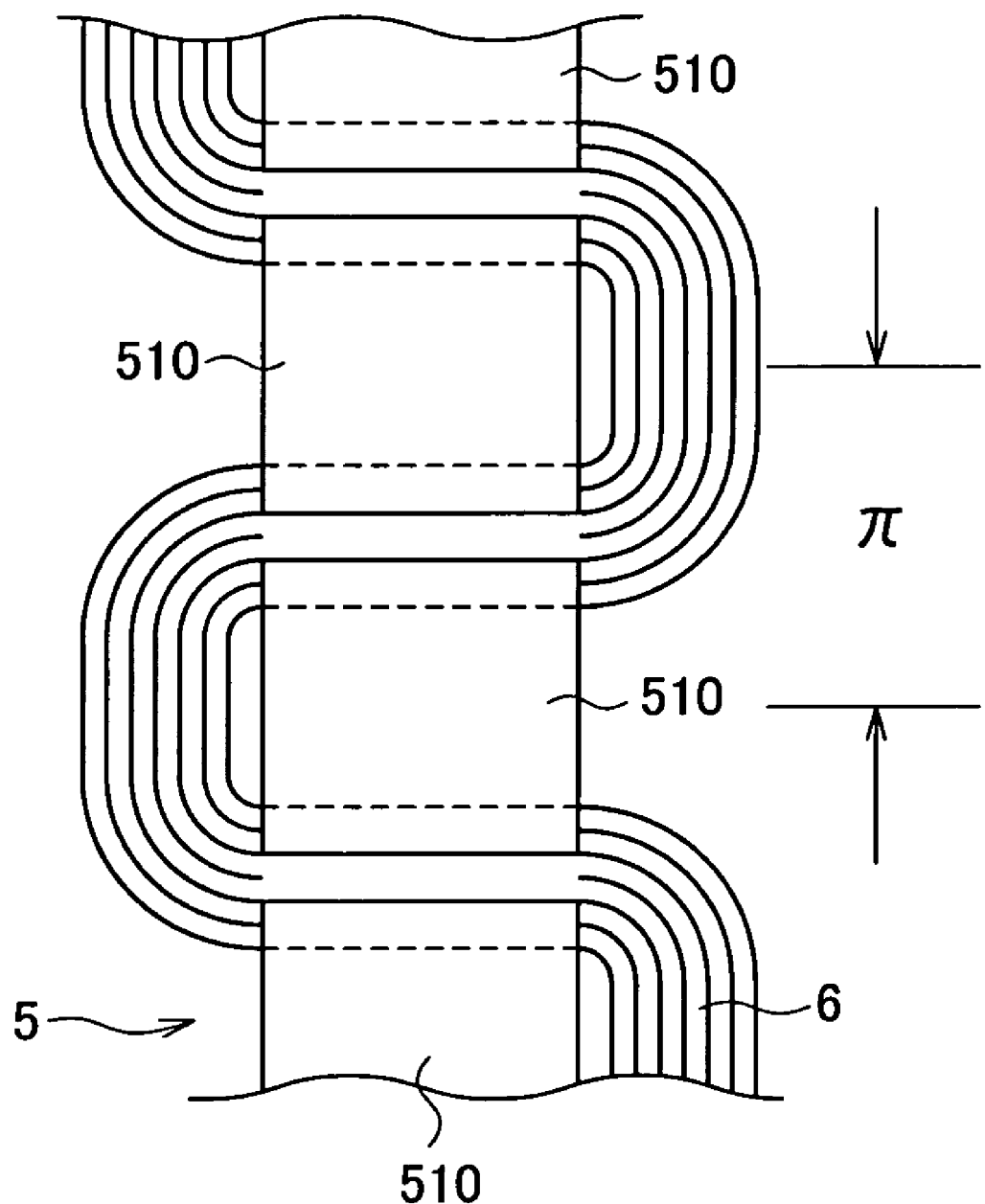
FIG. 2 is a partially enlarged circumferential development illustrating the rotor of the speed-variable field winding type of synchronous rotary electric machine illustrated in FIG. 1.

FIG. 2 is a circumferential development of the rotor 4 employed in the present embodiment.

The rotor core 5 of the rotor 4 has eight core teeth 510, that is, eight field poles (magnetic salient poles), in total circumferentially arranged at regular intervals. Rotor coils 6 are wound in a shape of wave, passing through the gaps between the core teeth 510. As a mater of course, the rotor coils 6 may be concentrically wound about the core teeth 510 or the rotor may have a Lundell-type structure.

(Stator Circuit)

Figure 3:
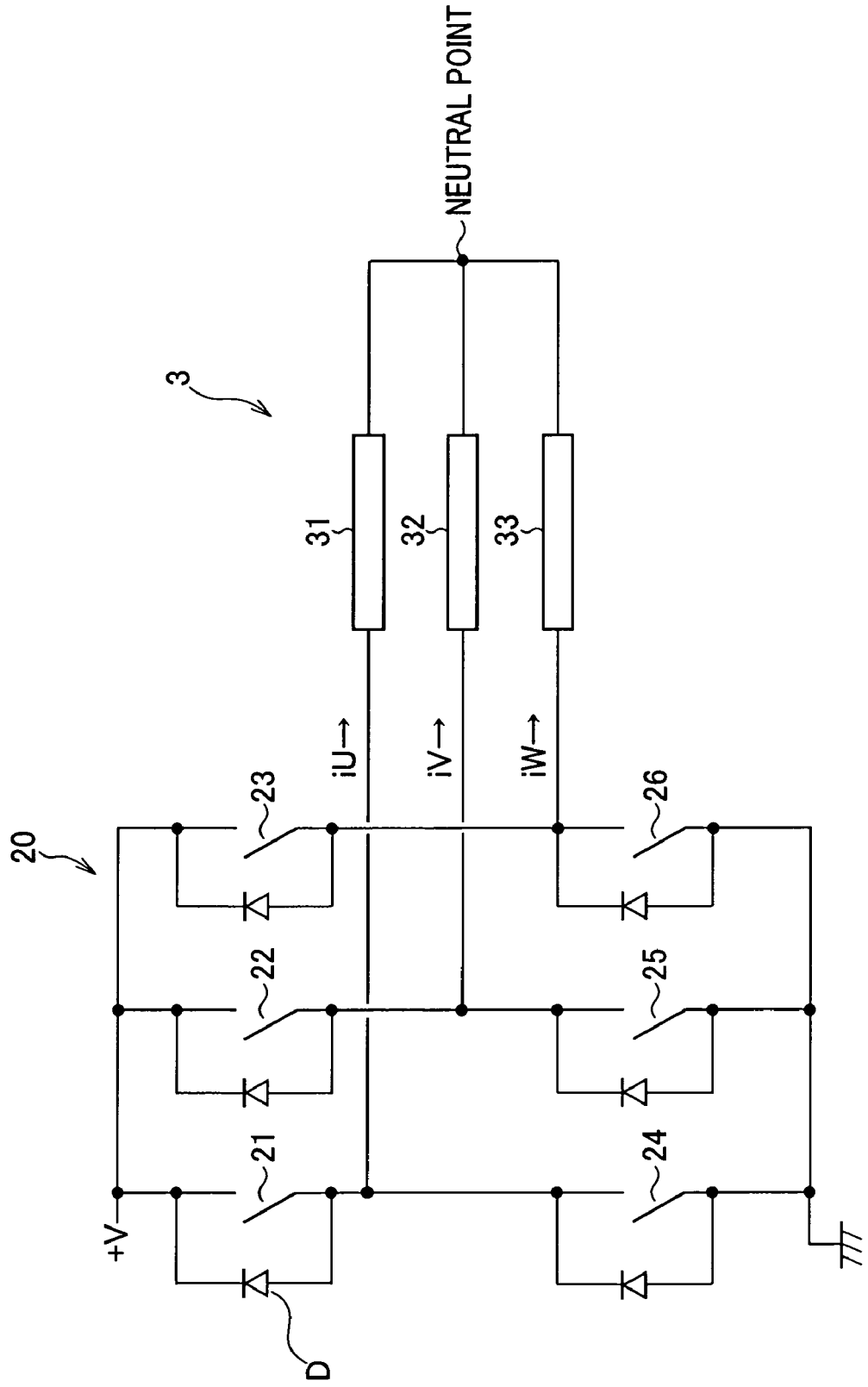
FIG. 3 is a schematic diagram of a stator circuit of the speed-variable field winding type of synchronous rotary electric machine illustrated in FIG. 1.

Referring to FIG. 3, an explanation hereinafter is provided on the circuit of the field winding type of synchronous rotary electric machine. The three-phase inverter 20 has a total of three upper-arm (switch) elements 21 to 23 and a total of three lower-arm (switch) elements 24 to 26. Each of the switch elements is made up of an IGBT (insulated gate bipolar transistor) with a flywheel diode D being connected thereto in an inverse-parallel fashion. As a matter of course, each of the switch elements may alternatively be made up of an MOS (metal oxide semiconductor) transistor. Phase winding wires 31 to 33 are connected to respective phases of the three-phase stator coils 3.

The controller 40 is a normal motor controller for controlling the rotation vectors of the magnetic field, which is configured to serve as a microcomputer. The controller 40 is configured to PWM-drive the switch elements of the inverter 20 through a gate driver, not shown, using given carrier signals.

It should be appreciated that, for example, the cycle of the carrier signals, or a carrier cycle, corresponding to triangular voltage may not necessarily be constant but may be switched stepwise or continuously, for example, according to the rate of rotations. As will be described later, however, one duration of time for supplying pulsed rotor-exciting current in the present embodiment is set based on the carrier cycle. Thus, it is preferred that the change in the duration of time for supplying pulsed rotor-exciting current due to the change in the carrier cycle, is adjusted by changing the duty ratio (duration of pulse voltage relative to carrier cycle) of the PWM voltage for forming the pulsed rotor-exciting current.

The structure and operation of the field winding type of synchronous rotary electric machine explained above are well known, and thus further explanation will be omitted.

(Rotor Circuit)

Figure 4:
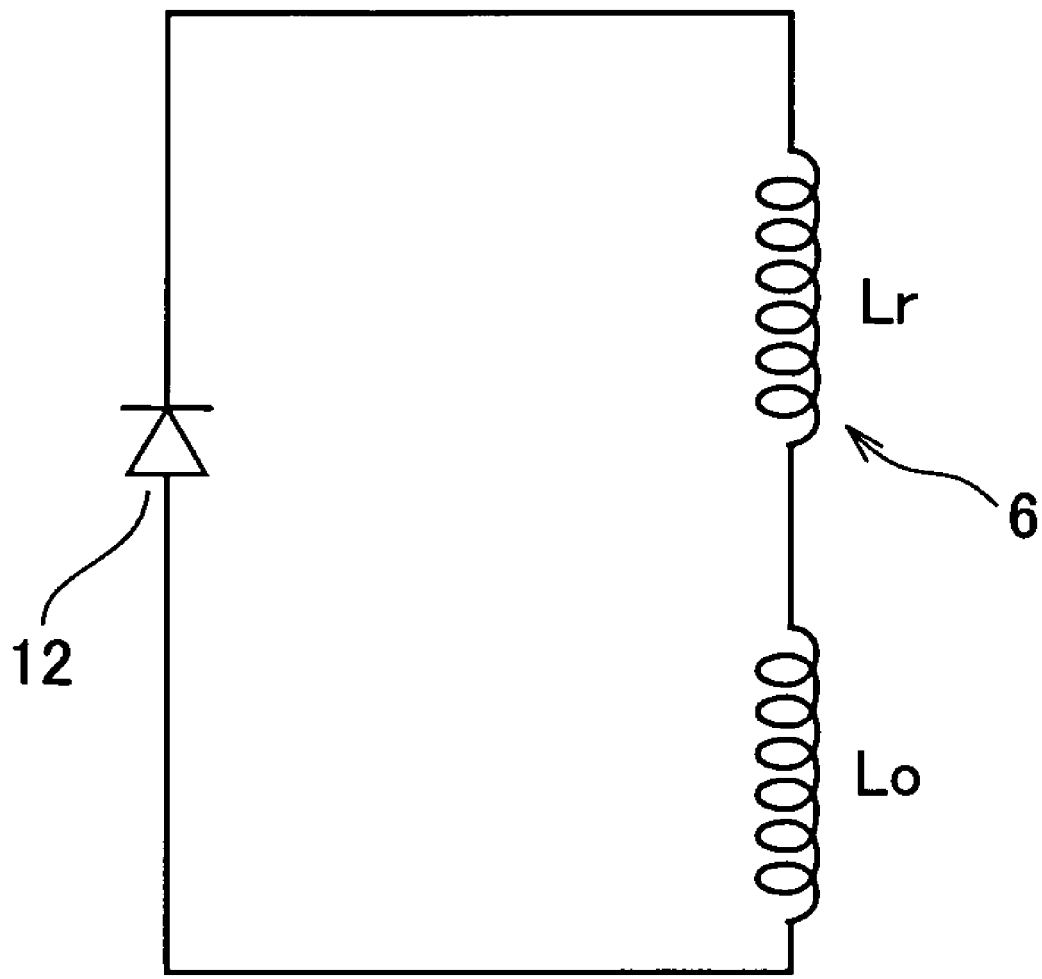
FIG. 4 is a schematic diagram of a rotor circuit of the speed-variable field winding type of synchronous rotary electric machine illustrated in FIG. 1.

As shown in FIG. 4, each rotor coil 6 is short circuited through a diode 12. Indicated by "Lr" is excitation inductance of the rotor coils 6, which inductance is electromagnetically coupled to the stator coils 3, and by "Lo" is leakage inductance of the rotor coils 6. The diode 12 half-wave rectifies the AC voltage induced to each rotor coil 6 to excite the odd-numbered core teeth 510 into N poles, and the even-numbered core teeth 510 into S poles. Specifically, two rotor coils 6 reversely wound about two circumferentially adjacent core teeth 510, respectively, pass induction current in the directions opposite to each other with the reversely directed diodes 12. Thus, the circumferentially adjacent two core teeth 510 each generate field magnetic flux in a direction opposite from that of the other. As an alternative to the above, the diode 12 may be changed with a synchronous transistor, or a capacitor may be connected parallel to the diode, or a choke coil may be connected in series to the diode 12. The diode 12 mentioned above configures a current suppressing circuit of the present invention. The inverter 20 and the controller 40 configure a current control circuit of the present invention. The leakage inductance "Lo" has a function of smoothing the induction current of the rotor coils 6.

(Current Supply Control for Synchronizing Current)

The controller 40 PWM-controls the inverter 20 based on the rotational position of the rotor, which is derived from the position sensor 10. This control can generate fundamental components of armature current corresponding to three-phase AC current synchronizing with the rotation of the rotor, that is, can generate synchronizing current for supply to the three-phase stator coils 3. Practically, a number of harmonic components may also be supplied to the stator coils 3 due to the switching for the PWM control of the inverter 20 or the nonlinearity of the magnetic circuits, for example. However, since the harmonic components are not essential elements, further explanation will be omitted.

With the supply of the synchronizing current to the stator coils 3, the synchronizing current rotates in synchronization with the rotation of the core teeth 510 that serve as field poles. The core teeth 510, or the field poles, generate magnetic flux with the rotor coils 6, and hence, by permitting the synchronizing current to rotate in synchronization with the core teeth 510, rotating torque is generated in the rotor 4. Preferably, a vectorial direction of the synchronizing current may include a position where the torque is maximized. This means that, in a synchronous motor, the synchronizing current, i.e. the fundamental components of the armature current, may preferably be made up only of q-axis current that generates torque, where d-axis current that generates field magnetic flux is "0". As a matter of course, the vectorial position, or the phase angle, of the synchronizing current may be adjusted with reference to the core teeth 510.

(Supply of Rotor-Exciting Current)

The inverter 20 is configured to supply current to the stator coils 3 by superposing the pulsed rotor-exciting current on the synchronizing current, the pulsed rotor-exciting current being supplied in a period considerably shorter than one cycle of the synchronizing current. Preferably, the duration of time for supplying the pulsed rotor-exciting current is set shorter than one cycle of a PWM carrier signal (carrier cycle). Accordingly, the pulsed rotor-exciting current contains fundamental frequency AC components having higher frequency than the synchronizing current, as well as harmonic components having higher order than the synchronizing current. As a result, the rotor coils 6 are induced with the AC voltage substantially corresponding to one cycle of waveform, for every pulse of rotor-exciting current, irrespective of the rotation or non-rotation of the rotor.

The superposition of the pulsed rotor-exciting current on the armature current, or synchronizing current, of each phase (hereinafter also referred to just as "phase current"), is carried out in three-phase star-connected armature winding, for example, which is wound in a distributed fashion by sequentially executing the following three current-supply modes. Substantially, the same is applicable to three-phase winding which is wound in a concentrated fashion.

(First Current Supply Mode)

One half of the pulsed rotor-exciting current is supplied in the positive direction through U-phase coils of the stator coils 3, and the other half of the pulsed rotor-exciting current is supplied in the negative direction through the remaining V- and W-phase coils.

(Second Current Supply Mode)

One half of the pulsed rotor-exciting current is supplied in the positive direction through the V-phase coils of the stator coils 3, and the other half of the pulsed rotor-exciting current is supplied in the negative direction through the remaining W- and U-phase coils.

(Third Current Supply Mode)

One half of the pulsed rotor-exciting current is supplied in the positive direction through the W-phase coils of the stator coils 3, and the other half of the pulsed rotor-exciting current is supplied in the negative direction through the remaining U- and V-phase coils.

In the above explanation, supplying current "in the positive direction" refers to supplying current from a phase terminal connected to a high-potential terminal of a DC power supply to a neutral point through the upper arm switches of the three-phase inverter 20. Contrarily, supplying current "in the negative direction" refers to supplying current from the neutral point to a low-potential terminal of the DC power supply through the lower arm switches of the three-phase inverter 20.

Figure 5:
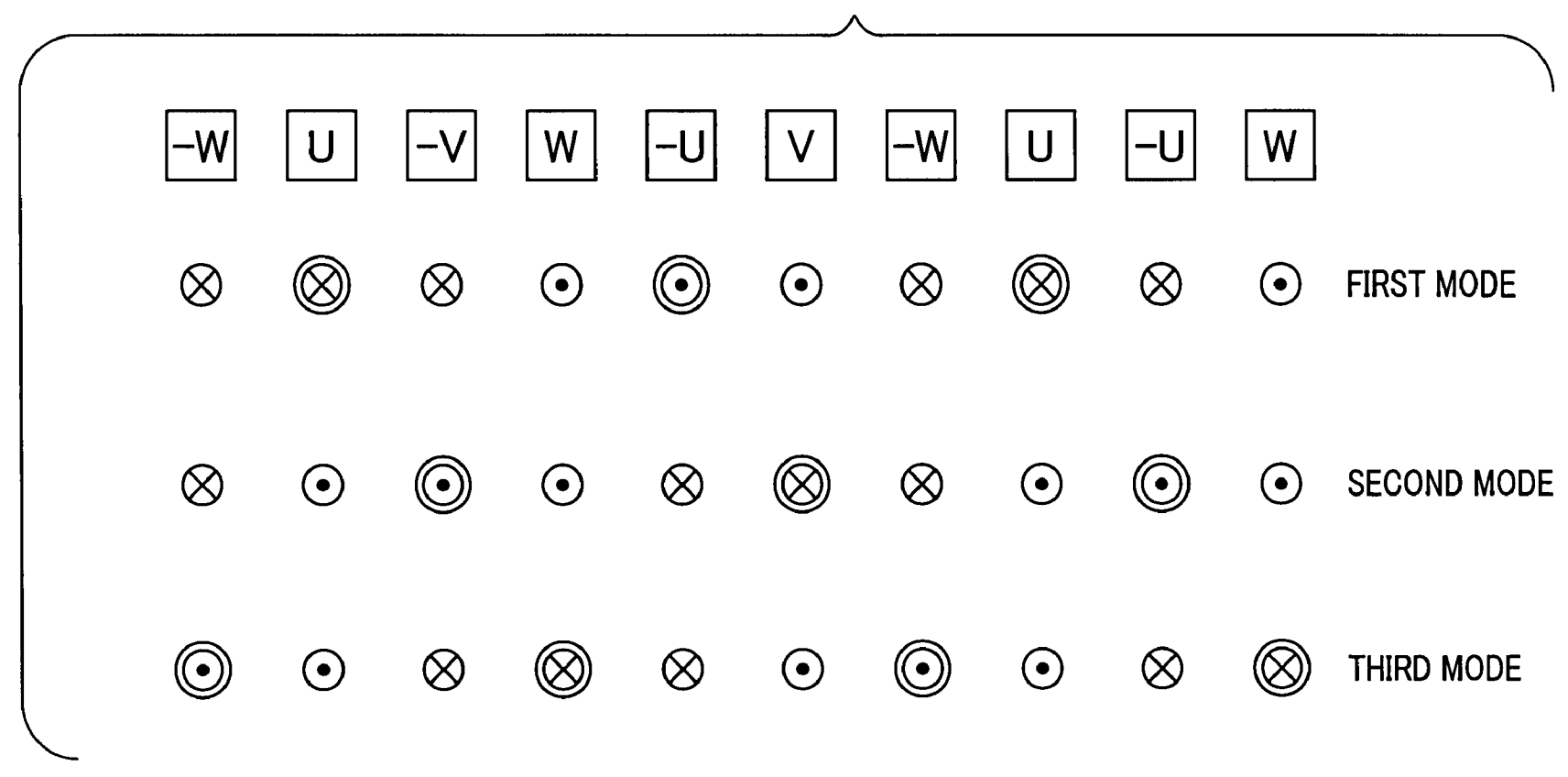

FIG. 5 shows spatial distribution of the pulsed rotor-exciting current in the circumferential direction in each of the current supply modes. In FIG. 5, U, V and W indicate forward turns of the respective phase coils as slot conductors, and –U, –V and –W indicate backward turns of the respective coils as slot conductors. The circled cross represents positive current, the circled dot represents negative current, and the double circled cross and the double circled dot represent a state where current is doubled.

As can be seen from the modes shown in FIG. 5, the circumferential current distribution is reversed at a circumferential pitch which is identical with the circumferential pitch of the core teeth 510 of the rotor core 5. As a result, it can also be seen that induction voltage will be generated in the rotor coils 6 upon drastic change of the pulsed rotor-exciting current.

However, the amount of magnetic flux interlinking with the rotor coils 6 may change depending on the spatial distribution in the circumferential direction of the pulsed rotor-exciting current as shown in FIG. 5, and the angular difference in the circumferential direction between the core teeth 510 and the phase coils wound about the teeth. Accordingly, the timing for supplying the pulsed rotor-exciting current in each mode should be set so that the timing can provide as good an interlinkage as possible between the unidirectional magnetic flux caused at the timing and the excitation current of the rotor coils 6.

(Phase Relationship between Pulsed Rotor-Exciting Current and Synchronizing Current)

Hereinafter is explained a favorable phase relationship between the pulsed rotor-exciting current and the synchronizing current.

Three-phase armature current, or three phase currents, supplied to the respective phase coils corresponds to the sum of the synchronizing current and the pulsed rotor-exciting current. In the present embodiment, the three phase currents are formed by PWM-controlling the inverter 20. In this case, an important factor is the timing for supplying the pulsed rotor-exciting current. For example, it is not a wise determination to supply large U-phase pulsed rotor-exciting current in the positive direction during a period when U-phase synchronizing current is maximized in the positive direction, or to supply large U-phase pulsed rotor-exciting current in the reverse (negative) direction during a period when U-phase synchronizing current is maximized in the reverse (negative) direction.

Specifically, since the voltage of the DC power supply is constant, the maximum amplitude, in the above case, allowed for the U-phase synchronizing current will be small. On the other hand, if the current supply direction is reversed in the same phase between the synchronizing current and the pulsed rotor-exciting current, the amplitude of the pulsed rotor-exciting current can be increased, without the necessity of reducing the maximum amplitude of the synchronizing current.

As will be understood from the above, it is desirable that the pulsed rotor-exciting current of each phase is supplied at the timing (phase angle) when the sum of the vectors of the three-phase pulsed rotor-exciting current that interlinks with a single rotor coil 6 will have as large a value as possible. As to the amplitude of the pulsed rotor-exciting current of each phase, it is desirable that the current supply direction is reversed as much as possible in the same phase between the synchronizing current and the pulsed rotor-exciting current.

The AC voltage induced to the rotor coils 6 is half-wave rectified by the diodes 12. Also, the direction of supplying current to the diodes 12 is set so as to be alternated along the circumferential direction. Hence, the field current induced to the rotor coils 6 is alternated. As a result, the field magnetic flux formed at the core teeth 510, i.e. the field poles, is also alternated along the circumferential direction.

The supply of current to each rotor coil 6 allows magnetic energy to be stored in the self-inductance of the rotor coil 6.

Therefore, current keeps flowing through the rotor coils 6 even after stopping supply of the pulsed rotor-exciting current to the stator coils 3.

(Conventional Pulsed Rotor-Exciting Current Superposing Method)

Conventional Current Supply Example 1

Figure 6:
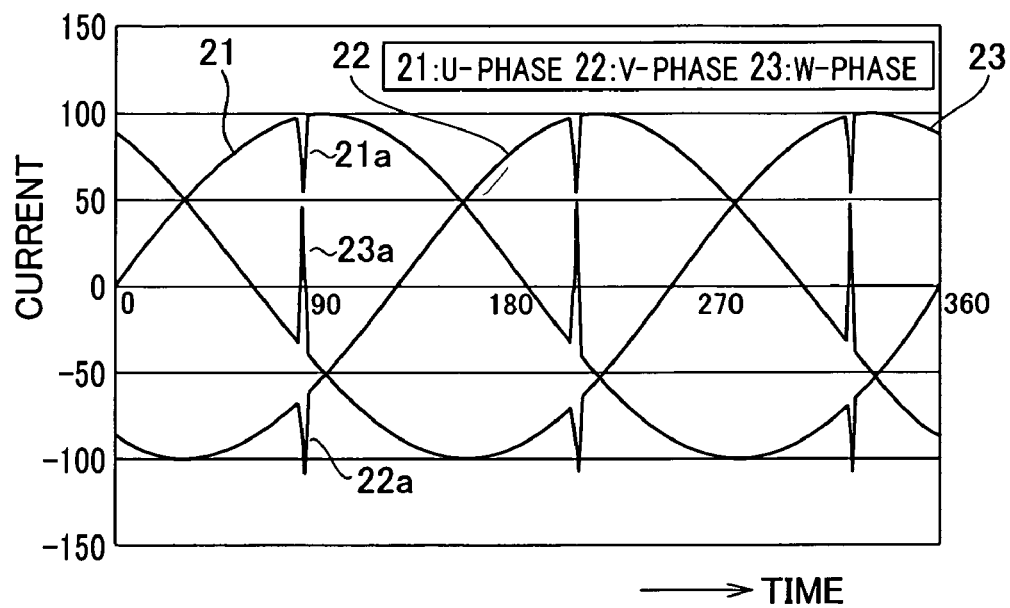
FIG. 6 is a timing diagram illustrating a current waveform in a current supply example.
Figure 7:
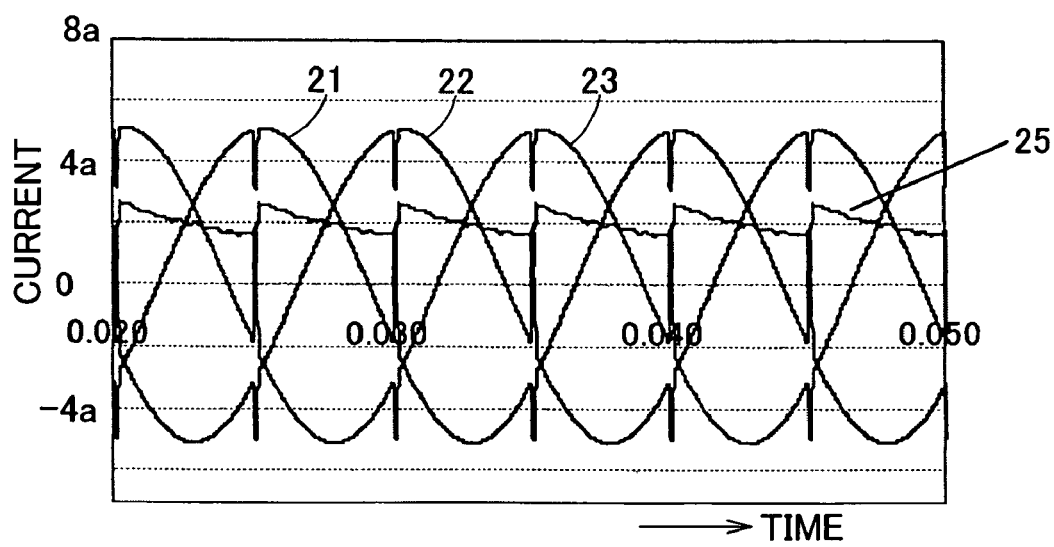
FIG. 7 is a timing diagram illustrating a field current waveform in the example of FIG. 6.

FIGS. 6 and 7 show the results of simulation using the pulsed rotor-exciting current superposing method disclosed in Japanese Patent Laid-Open Publication No. 2007-185082. The simulation was conducted at 1000 rpm using a motor model installing simulation software JMAG®. In each of the figures in the following explanation, the horizontal axis indicates time. The current that flows in each rotor coil 6 after half rectification is referred to "field current". In the present example, the pulsed rotor-exciting current was supplied three times per cycle of synchronizing current in a phase-sequential manner at a constant time interval.

In FIG. 6 shows U-phase current 21, V-phase current 22 and W-phase current 23. Pulsed rotor-exciting currents 21a, 22a and 23a are supplied to U-, V- and W-phases, respectively.

Figure 8:
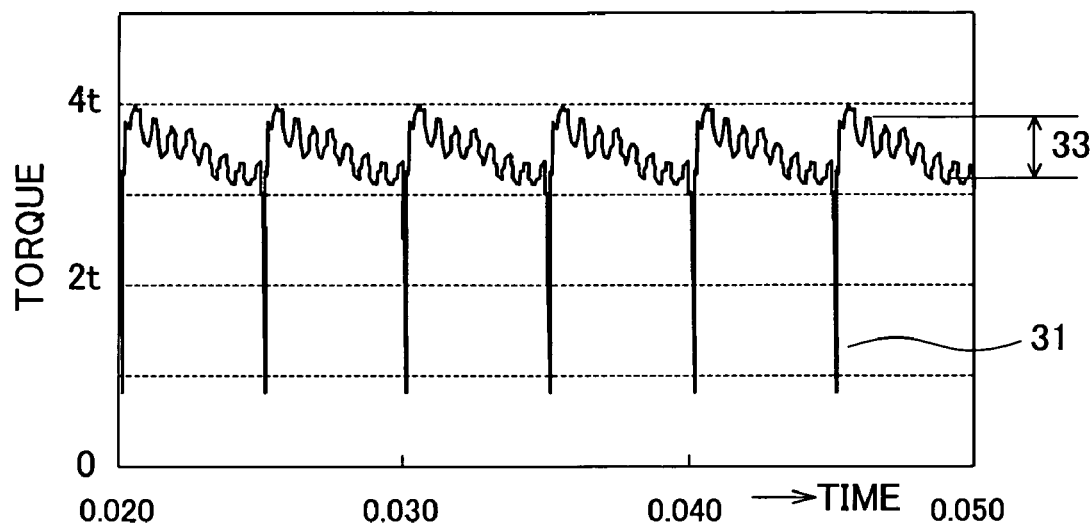
FIG. 8 is a timing diagram illustrating a torque waveform in the example of FIG. 6.

FIG. 7 shows a waveform of field current 25 and FIG. 8 shows a torque waveform. A reference 31 indicates torque peak variation at the time when the pulsed rotor-exciting current is supplied. A reference 33 indicates torque ripple caused by the attenuation of the field current.

It will be understood from the figures that the torque ripple caused by the attenuation of the field current increases when the motor model rotates at low speed, or when the pulsed rotor-exciting current has a long interval.

Conventional Current Supply Example 2

Figure 9:
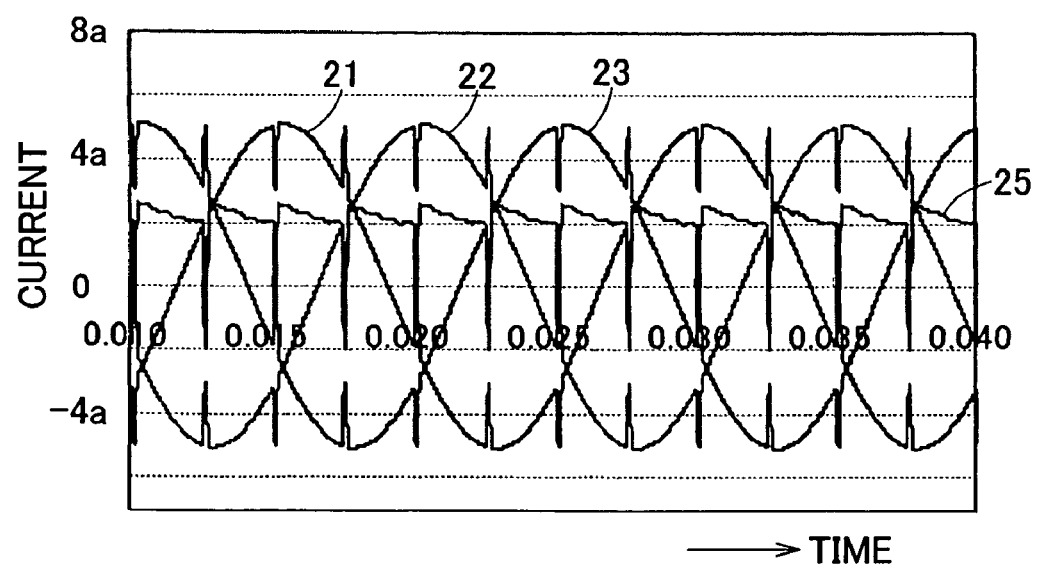
FIG. 9 is a timing diagram illustrating a current waveform and a field current waveform in a current supply example.
Figure 10:
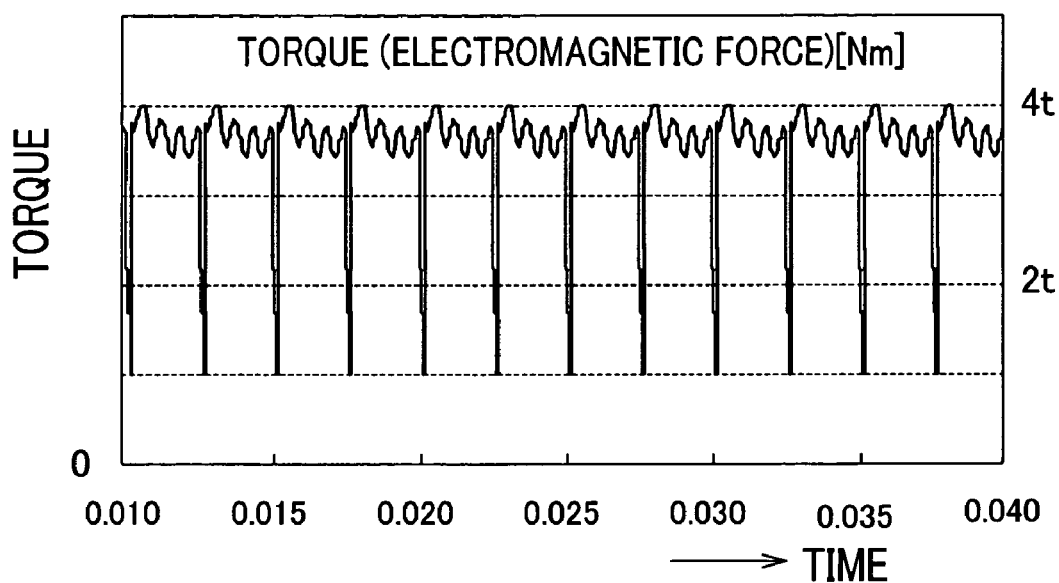
FIG. 10 is a timing diagram illustrating a torque waveform in the example of FIG. 9.

FIG. 9 shows a current waveform in the case where the pulsed rotor-exciting current was supplied six times at 1000 rpm per cycle of synchronizing current in a phase-sequential manner at a constant time interval FIG. 10 shows a torque waveform.

It will be understood from the figures that the torque ripple is drastically reduced because the pulsed rotor-exciting current is supplied at a short interval.

(Conventional Current Supply Example 3)

Figure 11:
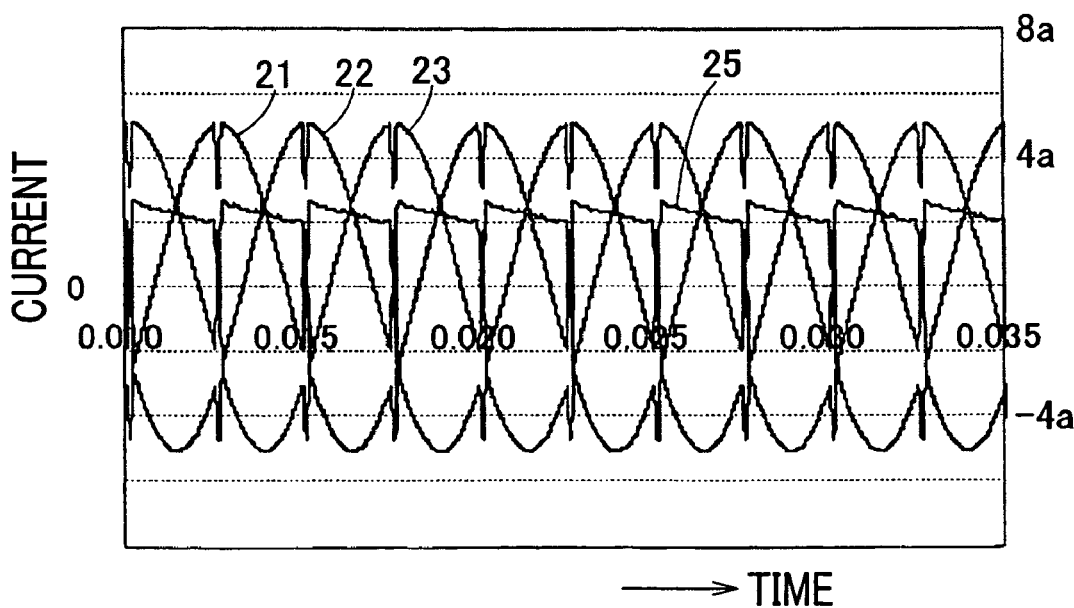
FIG. 11 is a timing diagram illustrating a current waveform and a field current waveform in a current supply example.
Figure 12:
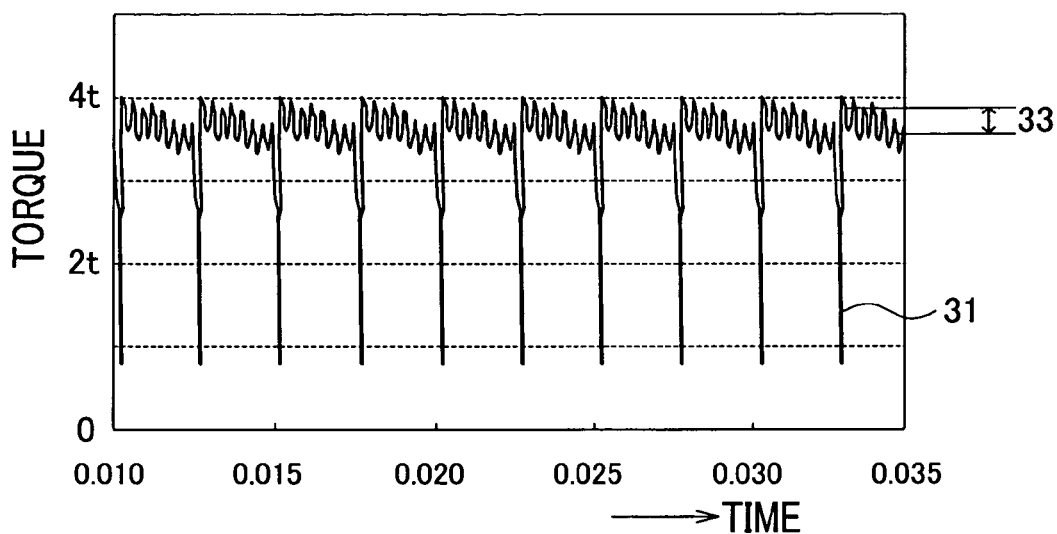
FIG. 12 is a timing diagram illustrating a torque waveform in the example of FIG. 11.
Figure 13:
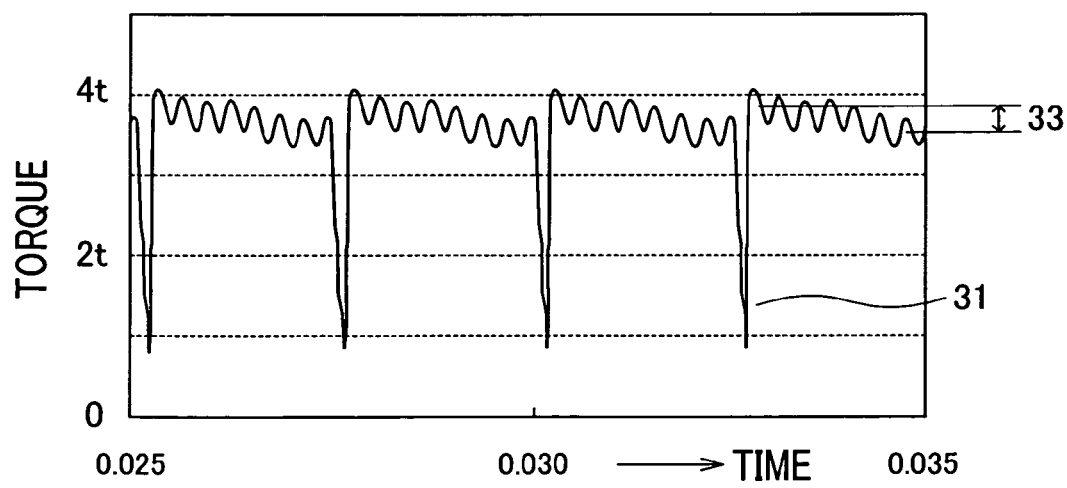
FIG. 13 is a timing diagram illustrating an enlarged torque waveform in the example of FIG. 11.

FIG. 11 shows a current waveform in the case where the pulsed rotor-exciting current was supplied three times at 2000 rpm per cycle of synchronizing current in a phase-sequential manner at a constant time interval. FIG. 12 shows a field current waveform and FIG. 13 shows a torque waveform.

As can be seen from the figures, one cycle of synchronizing current is decreased to half comparing with Conventional Current Supply Example 1 because of the increase in the rate of rotations up to 2000 rpm. Accordingly, the interval for supplying the pulsed rotor-exciting current is shortened, whereby the torque ripple can be drastically reduced.

Conventional Current Supply Example 4

Figure 14:
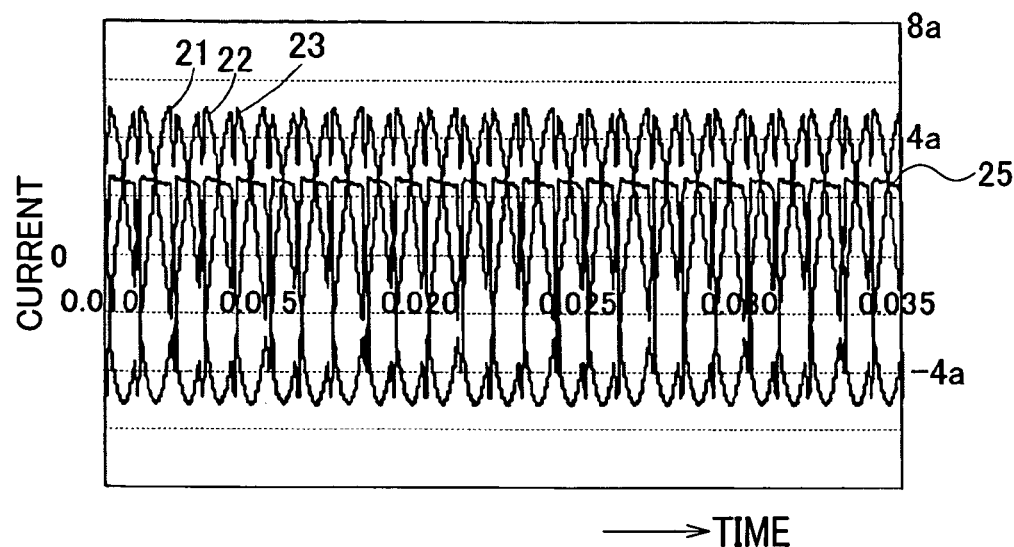
FIG. 14 is a timing diagram illustrating a current waveform and a field current waveform in a current supply example.
Figure 15:
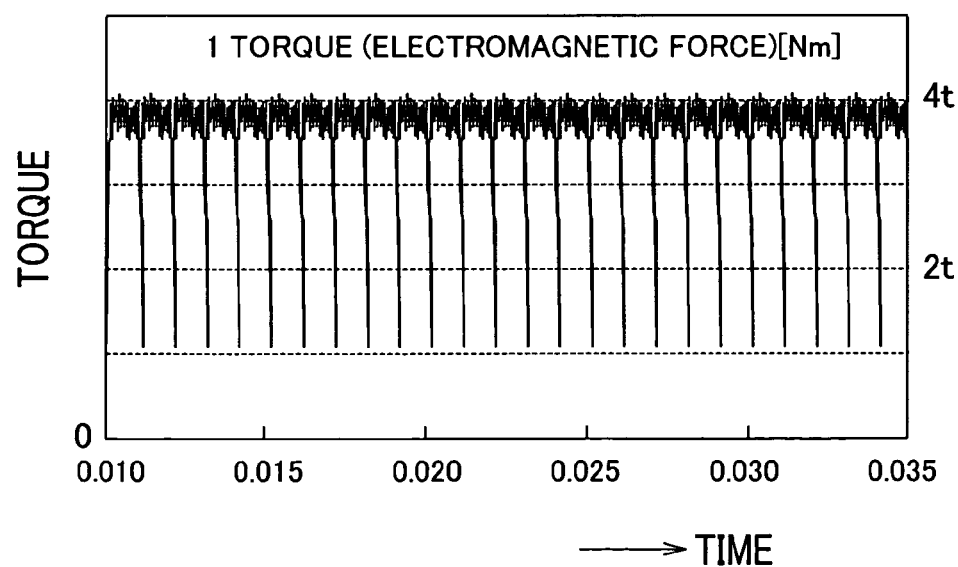
FIG. 15 is a timing diagram illustrating a torque waveform in the example of FIG. 14.
Figure 16:
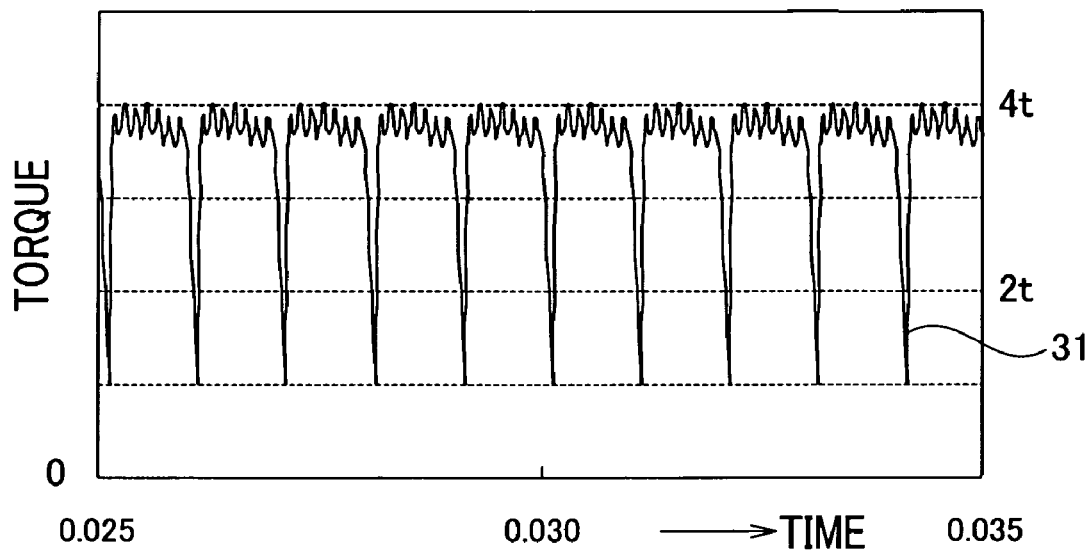
FIG. 16 is a timing diagram illustrating an enlarged torque waveform in the example of FIG. 14.

FIG. 14 shows a current waveform in the case where the pulsed rotor-exciting current was supplied three times at 5000 rpm per cycle of synchronizing current in a phase-sequential manner at a constant time interval. FIG. 15 shows a field current waveform and FIG. 16 shows a torque waveform.

As can be seen from the figure, one cycle of synchronizing current is significantly decreased comparing with Conventional Current Supply Example 1 because of the drastic increase in the rate of rotations. As a result, the torque ripple is drastically reduced. Thus, the significant decrease in one cycle of synchronizing current with the increase in the rate of rotations, leads accordingly to the drastic reduction in the interval of supplying the pulsed rotor-exciting current. Irrespective of this fact, the duration of time in the peak torque variation at the time of supplying the pulsed rotor-exciting current is prolonged relative to the duration of one cycle of synchronizing current because the period for supplying the pulsed rotor-exciting current is constant, whereby fluctuation is increased in the torque (see FIG. 16). Also, as can be seen, the average torque is decreased and the strain in the torque waveform is increased, being influenced by the fluctuation in the torque.

(Inventive Pulsed Rotor-Exciting Current Superposing Method)

In order to resolve the problem of the conventional technique explained above, Inventive Current Supply Example 1 provided below thins out (i.e., reduces) the number of supplies of the pulsed rotor-exciting current, so as to extend the interval of supplying the pulsed rotor-exciting current in a high-speed rotation region.

For example, when the rate of rotations exceeds a predetermined threshold, the interval for supplying the pulsed rotor-exciting current may be changed from one supply per "2π/m" cycle to one supply per "n×2πm/m" cycle, where "n" is an integer of 2 or more, and "m" is the number of phases. This corresponds to supplying pulsed rotor-exciting current in the positive direction at the cycle of "n×2π/m" for every phase. However, "n=m" should be inhibited. This is because "n=m" will significantly unbalance the pulsed rotor-exciting current.

By reducing the number of supplies of the pulsed rotor-exciting current as explained above, the pulsed rotor-exciting current in each phase will be sequentially reduced. As a result, the duration of time in the peak torque variation at the time of supplying the pulsed rotor-exciting current will be shortened relative to the duration of one cycle of synchronizing current. Also, the average torque will be increased and the strain in the torque waveform will be decreased. In addition, the unbalance of the current between phases can be reduced because the pulsed rotor-exciting current in each phase is sequentially reduced.

Inventive Current Supply Example 1

Figure 17:
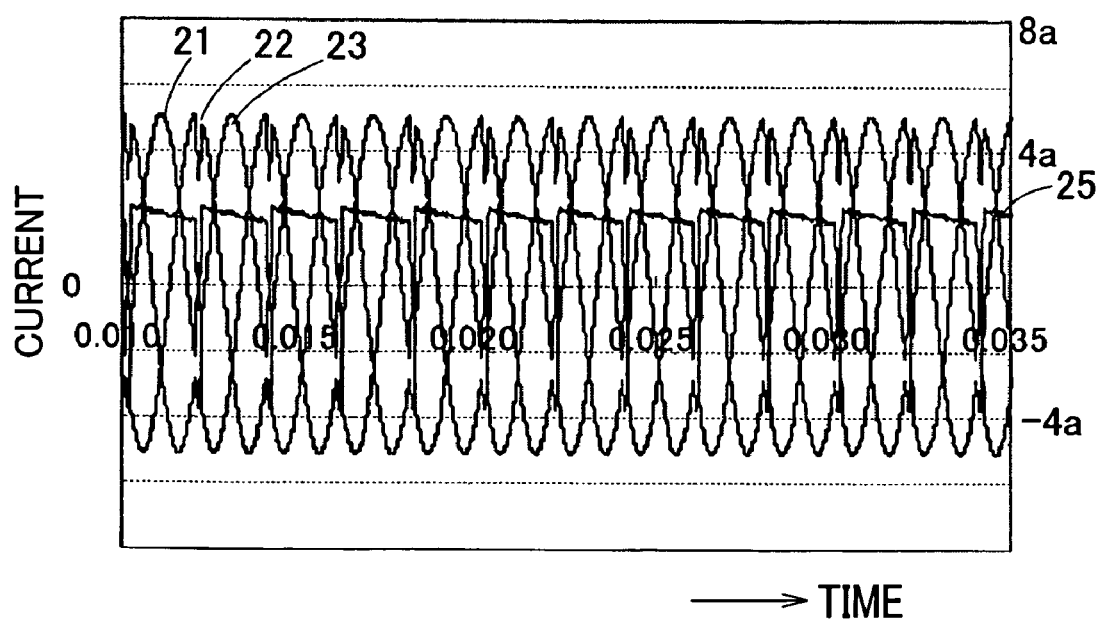
FIG. 17 is a timing diagram illustrating a current waveform and a field current waveform in a current supply example.
Figure 18:
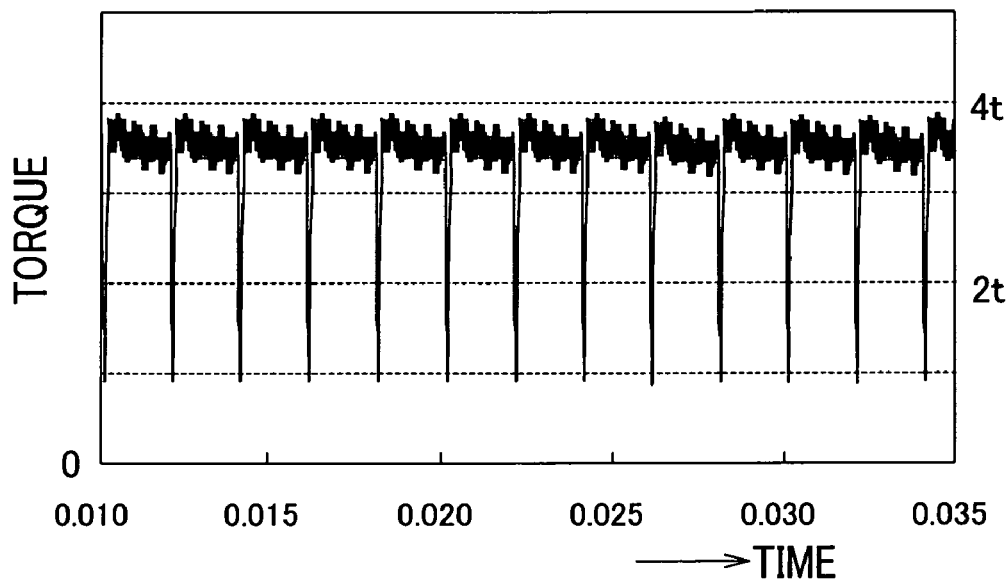
FIG. 18 is a timing diagram illustrating a torque waveform in the example of FIG. 17.
Figure 19:
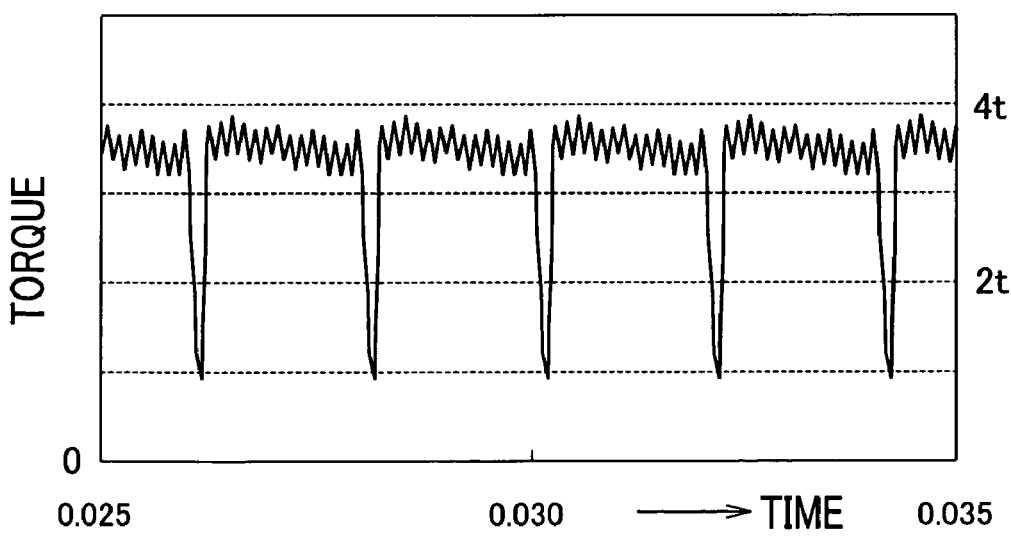
FIG. 19 is a timing diagram illustrating an enlarged torque waveform in the example of FIG. 17.

FIGS. 17 to 19 show the results of simulation in which the pulsed rotor-exciting current is supplied at 5000 rpm for every electrical angle of "4π/3" (n=2) in a phase-sequential manner. According to the present example, the pulsed rotor-exciting current can be equally supplied to the winding wires of the individual phases. As can be seen from FIGS. 18 and 19, the torque ripple is suppressed from being increased, irrespective of the increase in the rate of rotations, resultantly leading to an increase in the average torque.

Inventive Current Supply Example 2

Figure 20:
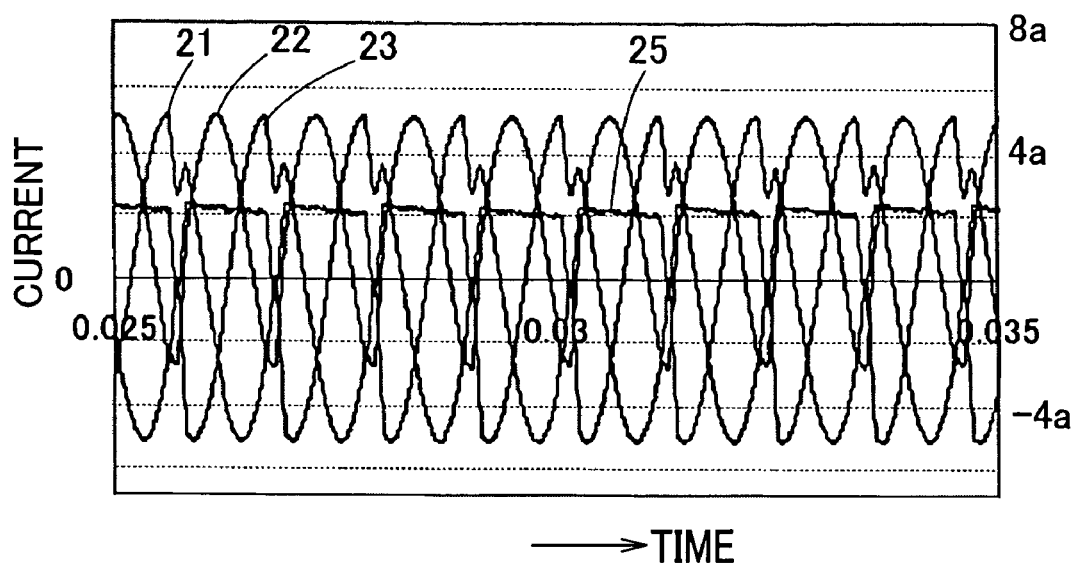
FIG. 20 is a timing diagram illustrating a current waveform and a field current waveform in a current supply example.
Figure 21:
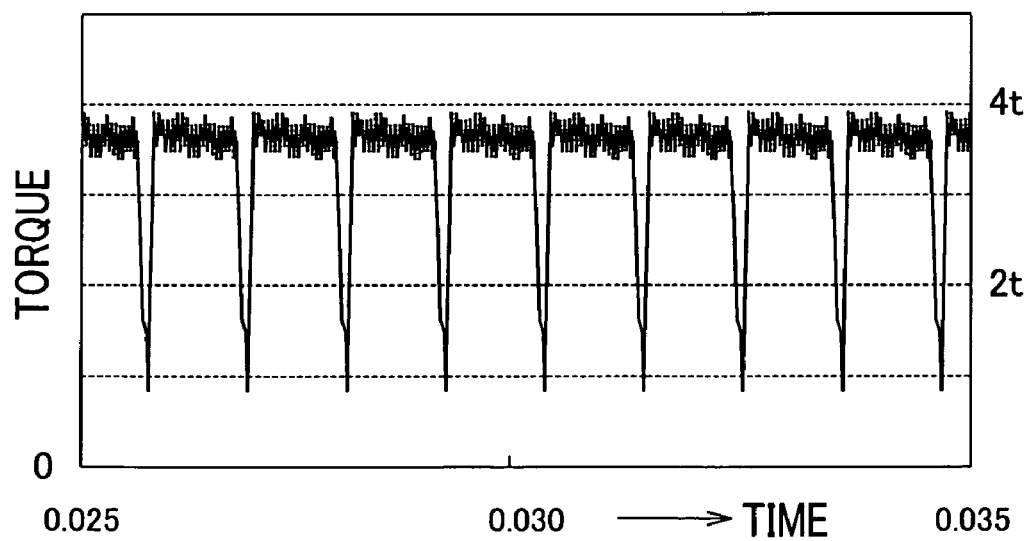
FIG. 21 is a timing diagram illustrating a torque waveform in the example of FIG. 20.

FIGS. 20 and 21 show the results of simulation in which the pulsed rotor-exciting current is supplied at 9000 rpm for every electrical angle of "4π/3" in a phase-sequential manner. According to the present example, the pulsed rotor-exciting current can be equally supplied to the winding wires of the individual phases As can be seen from the figures, the torque ripple is suppressed from being increased, irrespective of the increase in the rate of rotations, resultantly leading to the increase in the average torque.

Inventive Current Supply Example 3

Figure 22:
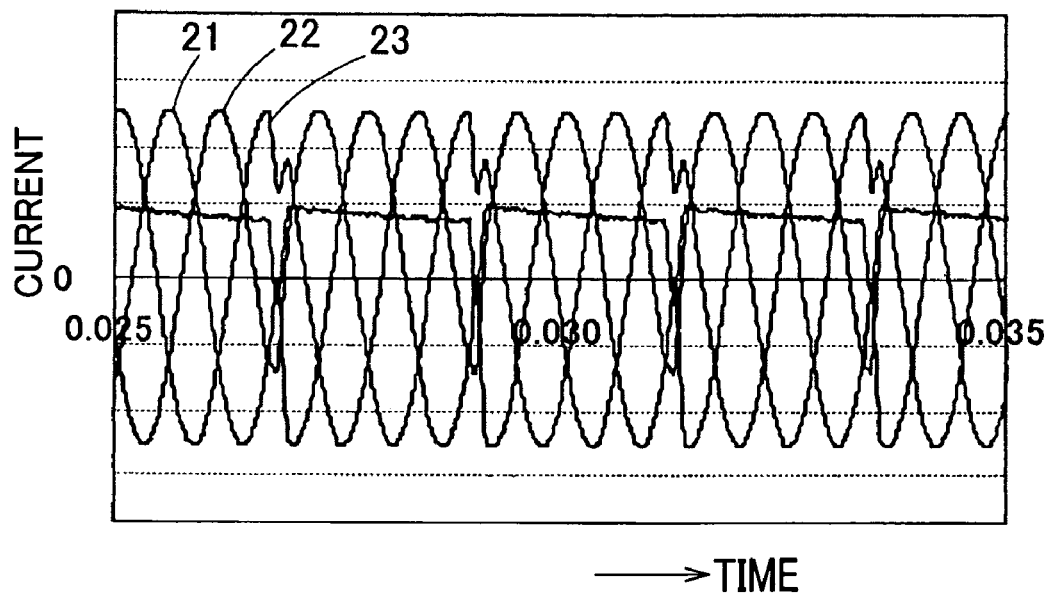
FIG. 22 is a timing diagram illustrating a current waveform and a field current waveform in a current supply example.
Figure 23:
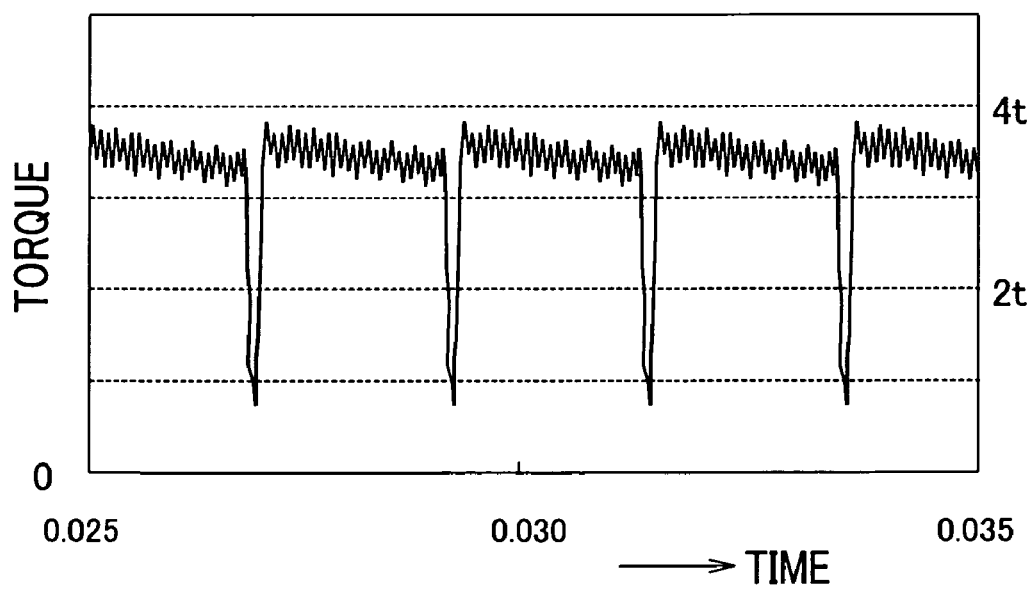
FIG. 23 is a timing diagram illustrating a torque waveform in the example of FIG. 22.

FIGS. 22 and 23 show the results of simulation in which the pulsed rotor-exciting current is supplied at 9000 rpm for every electrical angle of "8π/3" in a phase-sequential manner. According to the present example, the pulsed rotor-exciting current can be equally supplied to the winding wires of the individual phases. As can be seen from the figures, the torque ripple is suppressed, irrespective of the increase in the rate of rotations, resultantly leading to the increase in the average torque.

Inventive Current Supply Example 4

Figure 24:
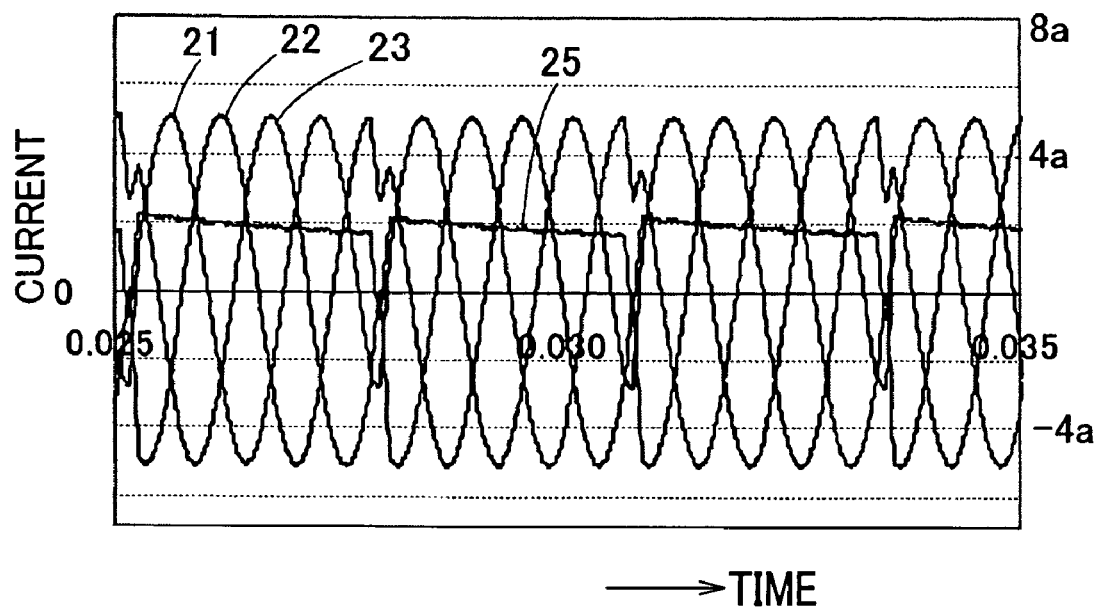
FIG. 24 is a timing diagram illustrating a current waveform and a field current waveform in a current supply example.
Figure 25:
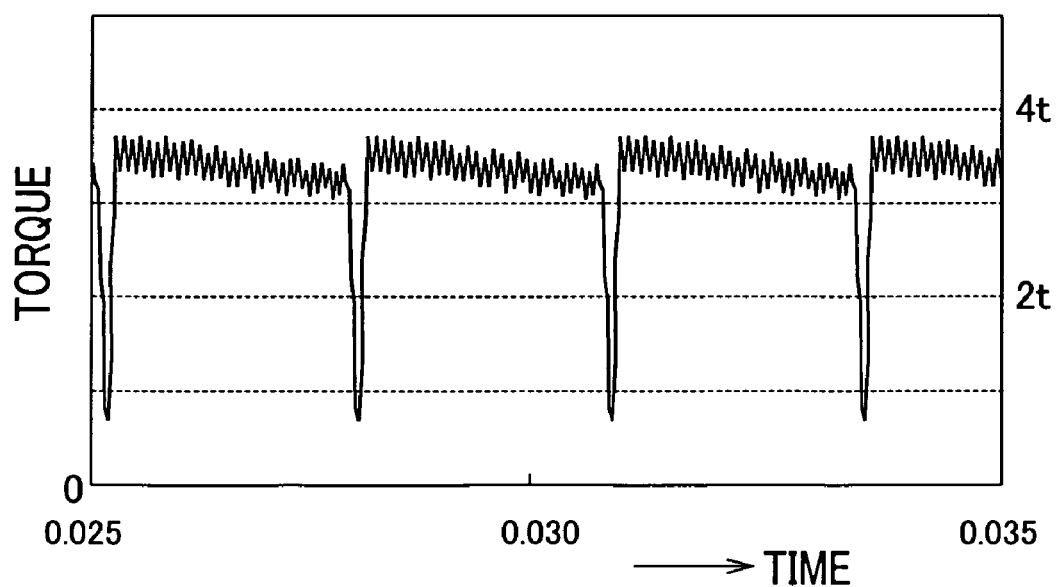
FIG. 25 is a timing diagram illustrating a torque waveform in the example of FIG. 24.

FIGS. 24 and 25 show the results of simulation in which the pulsed rotor-exciting current is supplied at 9000 rpm for every electrical angle of "10π/3" in a phase-sequential manner. According to the present example, the pulsed rotor-exciting current can be equally supplied to the winding wires of the individual phases. As can be seen from the figures, the torque ripple is suppressed from being increased, irrespective of the increase in the rate of rotations, resultantly leading to the increase in the average torque.

Inventive Current Supply Example 5

Figure 26:
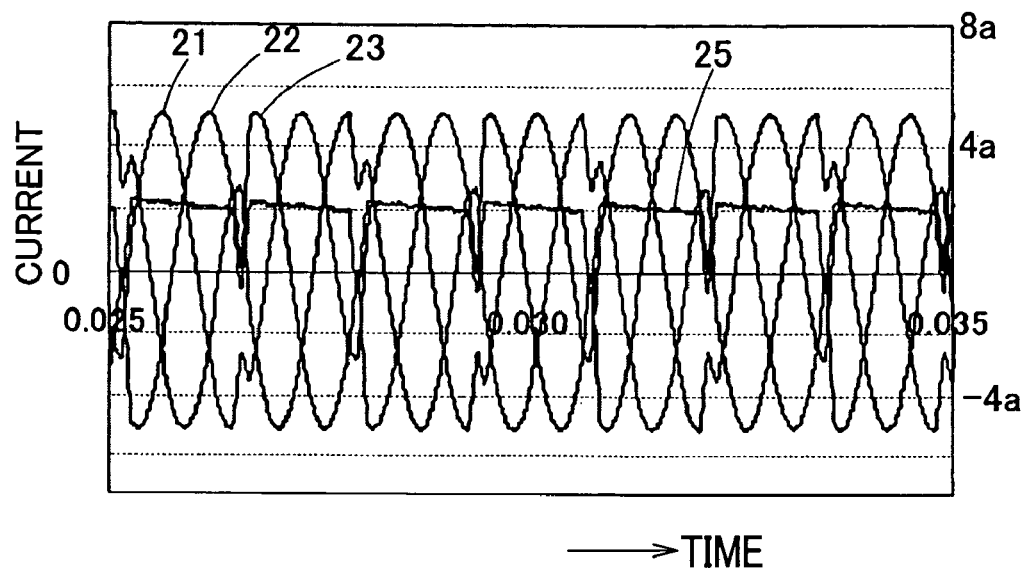
FIG. 26 is a timing diagram illustrating a current waveform and a field current waveform in a current supply example.
Figure 27:
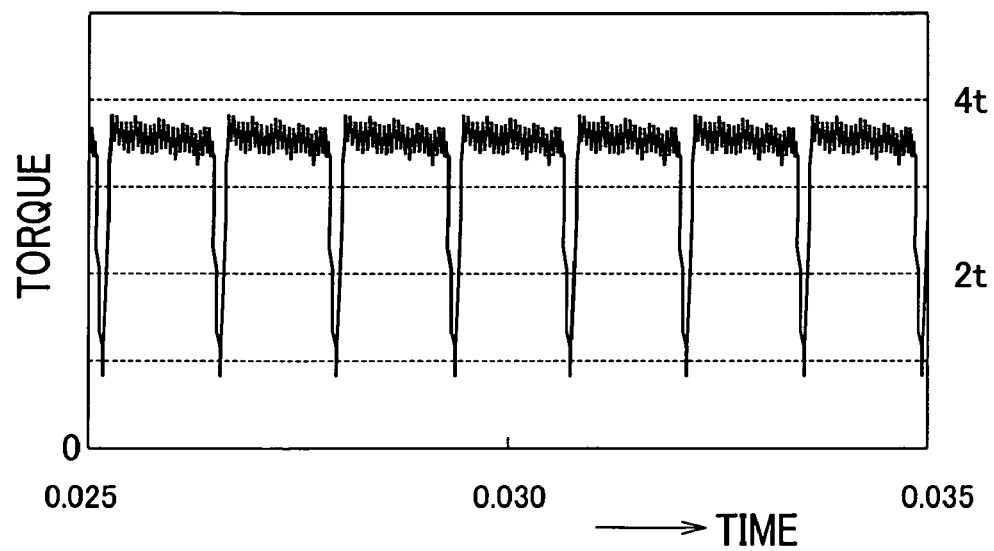
FIG. 27 is a timing diagram illustrating a torque waveform in the example of FIG. 26.

FIGS. 26 and 27 show the results of simulation in which the pulsed rotor-exciting current is supplied at 9000 rpm for every electrical angle of "5π/3" in a phase-sequential manner. In the present example, however, the direction of supplying the pulsed rotor-exciting current is reversed in a chronological manner. According to the present example, the pulsed rotor-exciting current can be equally supplied to the winding wires of the individual phases. As can be seen from the figures, the torque ripple is suppressed from being increased, irrespective of the increase in the rate of rotations, resultantly leading to the increase in the average torque.

Inventive Current Supply Example 6

Figure 28:
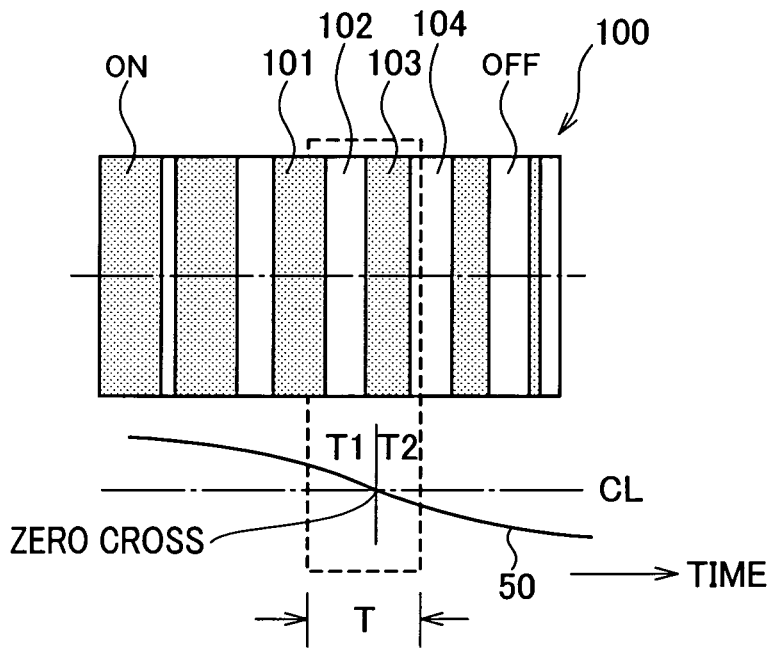
FIG. 28 is a timing diagram illustrating a PWM voltage waveform for generating synchronizing current in a current supply example.
Figure 29:
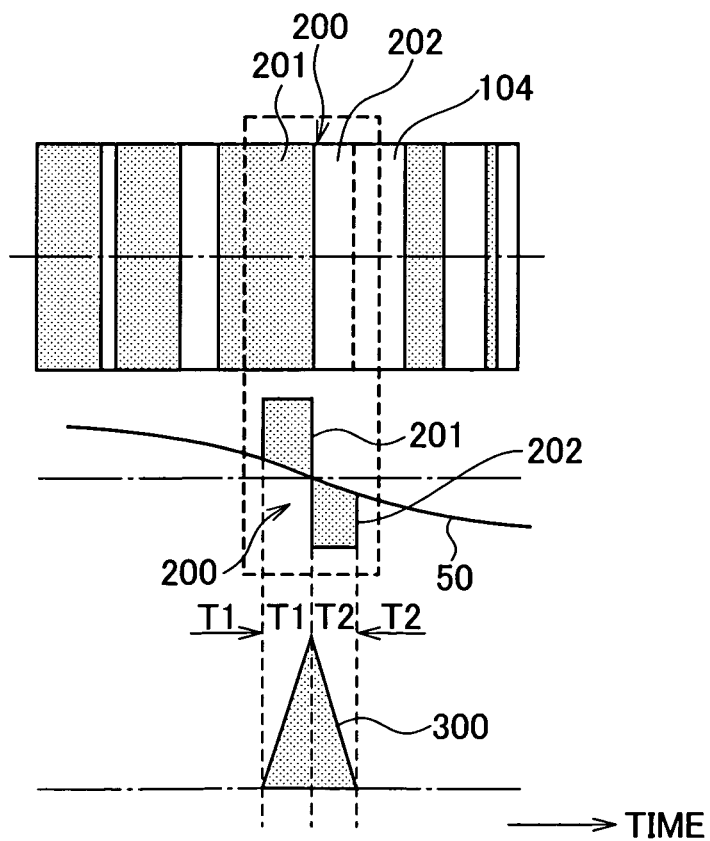
FIG. 29 is a timing diagram illustrating a PWM voltage waveform for generating synchronizing current and pulsed rotor-exciting current in the example of FIG. 28.

Referring now to FIGS. 28 and 29, Inventive Current Supply Example 6 is explained. The present example can be carried out concurrently with the examples provided above.

FIG. 28 shows a portion of PWM voltage 100 for generating synchronizing current 50 for one phase. FIG. 29 shows a waveform in which the PWM voltage 100 of FIG. 28 has been superposed by PWM voltage 200 for generating the pulsed rotor-exciting current. The filled-in areas in the figures represent the areas where the PWM voltage is high, and the blank areas represent the areas where the PWM voltage 26 is low.

The PWM voltage 200 for generating the pulsed rotor-exciting current consists of high-voltage areas 201 and low-voltage areas 202.

In FIGS. 28 and 29, the high-voltage area 201 of the PWM voltage 200 for generating the pulsed rotor-exciting current is provided so as not to be discontinuous, as much as possible, from the immediately preceding high-voltage area 101 of the PWM voltage 100 for generating synchronizing current. The low-voltage area 202 of the PWM voltage 200 is provided continuously from this high-voltage area 201. Thus, the low-voltage area 102 and the high-voltage area 103 of the PWM voltage 100 are removed from the areas shown FIG. 29.

In FIG. 28, indicated by "T" is a maximum duration of the pulsed rotor-exciting current, by "T1" is a duration of the high-voltage area 201 of the PWM voltage 200 for the pulsed rotor-exciting current, and by "T2" is a duration of the low-voltage area 202 of the PWM voltage 200. Thus, the pulsed rotor-exciting current can be superposed on the synchronizing current in a simple manner for every phase, while at the same time the increase in the torque ripple or torque strain can be suppressed.

In the present embodiment described above, a relation "T1=T2" has been satisfied. However, this should not be construed as making a limitation. Also, it is preferred that the maximum duration "T" of the pulsed rotor-exciting current is equal to and in synchronization with one cycle of the PWM voltage for the synchronizing current. However, this should not be construed as making a limitation. In FIGS. 28 and 29, the boundary between the high- and low-voltage areas 201 and 202 of the PWM voltage 200 for the pulsed rotor-exciting current has been matched with a zero cross level point. However, this should not be construed as making a limitation.

Figure 30:
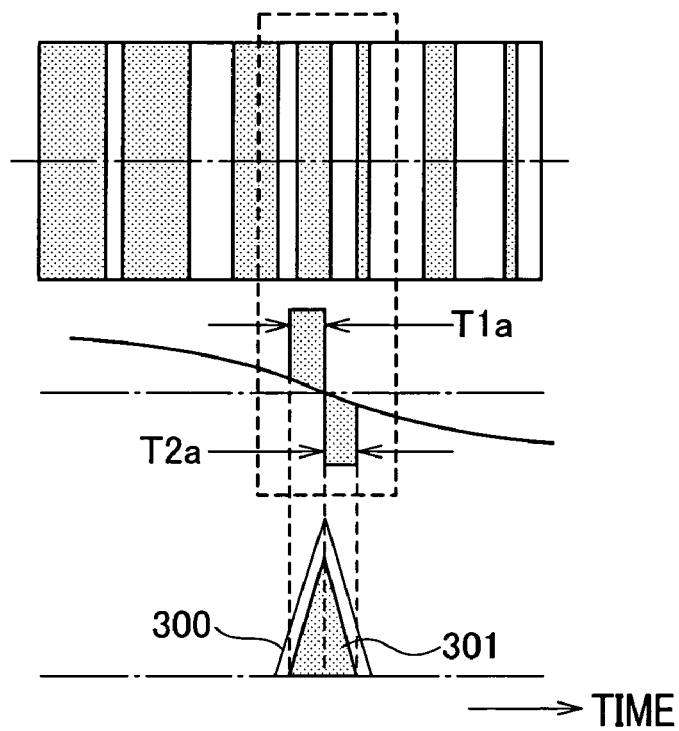
FIG. 30 is a timing diagram illustrating that the amplitude of pulsed rotor-exciting current is changed by adjusting the duration of time for applying the PWM voltage for generating the pulsed rotor-exciting current in the example of FIG. 29.

In FIG. 29, a reference 300 indicates a waveform of pulsed rotor-exciting current generated by the PWM voltage 200 for the pulsed rotor-exciting current. FIG. 30 shows the duration of the PWM voltage 200, which is shorter than that shown in FIG. 29. A duty ratio of the PWM voltage 200 is set as being 50%. As can be seen, by adjusting the duration of the PWM voltage 200, the amplitude of pulsed rotor-exciting current 301 can be easily adjusted.

Figure 31:
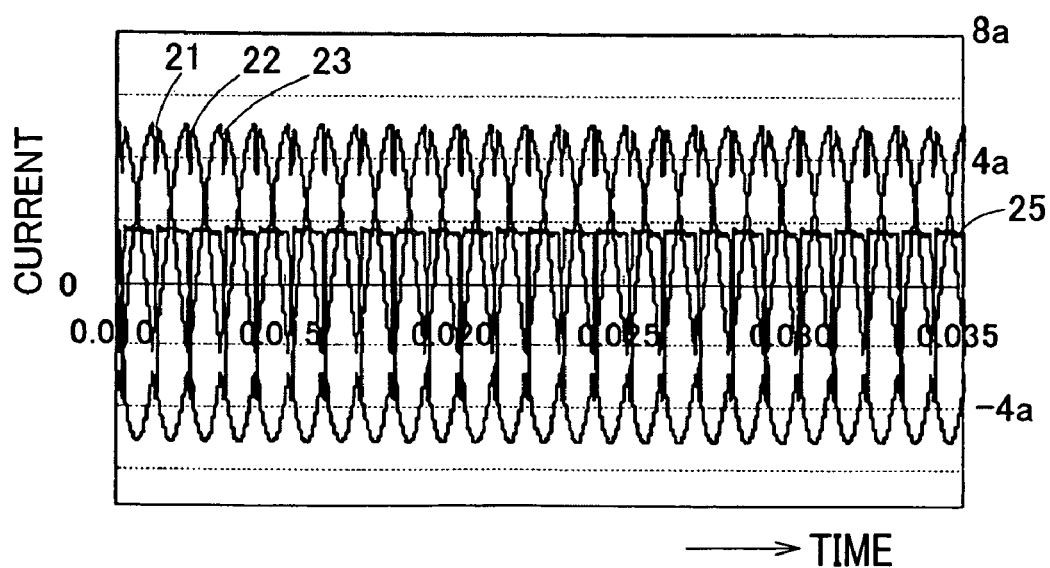
FIG. 31 is a timing diagram illustrating a current waveform and a field current waveform in a current supply example.
Figure 32:
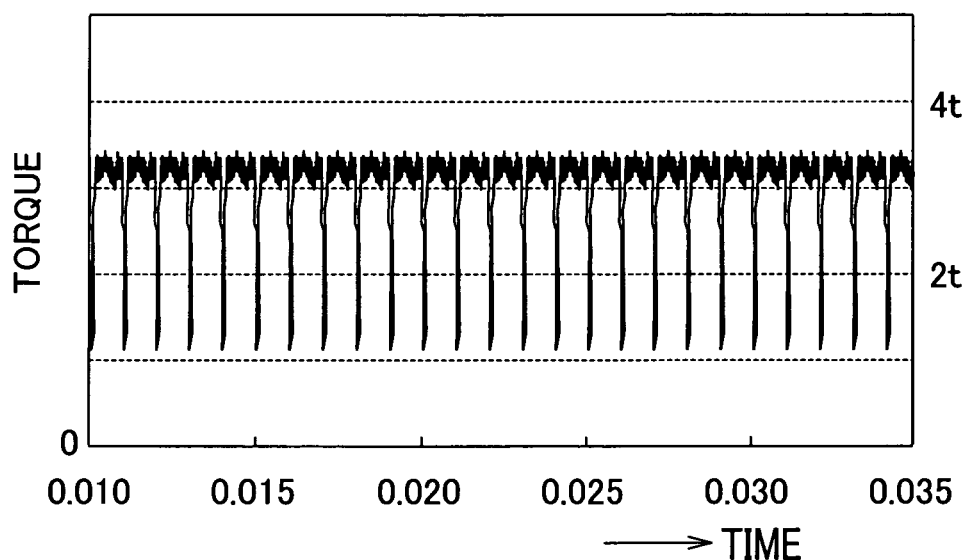
FIG. 32 is a timing diagram illustrating a torque waveform in FIG. 31.
Figure 33:
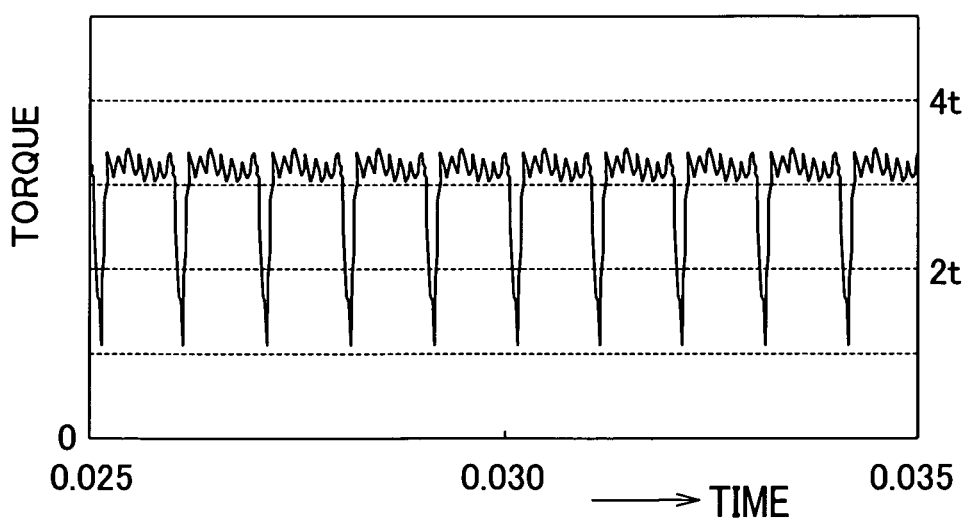
FIG. 33 is a timing diagram illustrating an enlarged torque waveform in the example of FIG. 31.

FIGS. 31 to 33 each show waveforms in which the duration of the pulsed rotor-exciting current shown in FIG. 30 has been reduced. FIG. 31 shows a current waveform in the case where the pulsed rotor-exciting current is supplied to three-phase winding at 5000 rpm for every electrical angle of $2\pi/3$ in a phase-sequential manner, FIG. 32 shows a field current waveform, and FIG. 33 shows a torque waveform.

As can be seen from FIGS. 31 to 33, the amplitude of the pulsed rotor-exciting current is reduced by reducing the duration of supplying the pulsed rotor-exciting current during high-speed rotation. Thus, the duration of the torque peak variation during the supply of the pulsed rotor-exciting current becomes small relative to the duration of one cycle of the synchronizing current. In short, it will be understood that the torque ripple is reduced by reducing the amplitude of the pulsed rotor-exciting current during high-speed rotation.

(Phase Relationship between Synchronizing Current and Pulsed Rotor-Exciting Current)

Each of the phases has a phase angle at which the amplitude of the synchronizing current is maximized (peak phase angle). With reference to the peak phase angle, a phase angle "α" at the boundary between the high-voltage area and the low-voltage area of the PWM voltage for generating the pulsed rotor-exciting current may desirably fall within a range of −15° to 105° in the case where electrical angle is expressed by $2\pi=360°$. The phase angle "α" here corresponds to a maximum value of the pulsed rotor-exciting current to be superposed on this particular phase. It should be appreciated that −15° indicates that the pulsed rotor-exciting current is advanced by 15° from the peak phase angle, and 105° indicates that the pulsed rotor-exciting current is delayed by 105° from the peak phase angle. In this way, the rotor-exciting current having large amplitude can be supplied while the waveform of the phase current can be suppressed from being distorted.

(Example of Current Supply Control)

Figure 34:
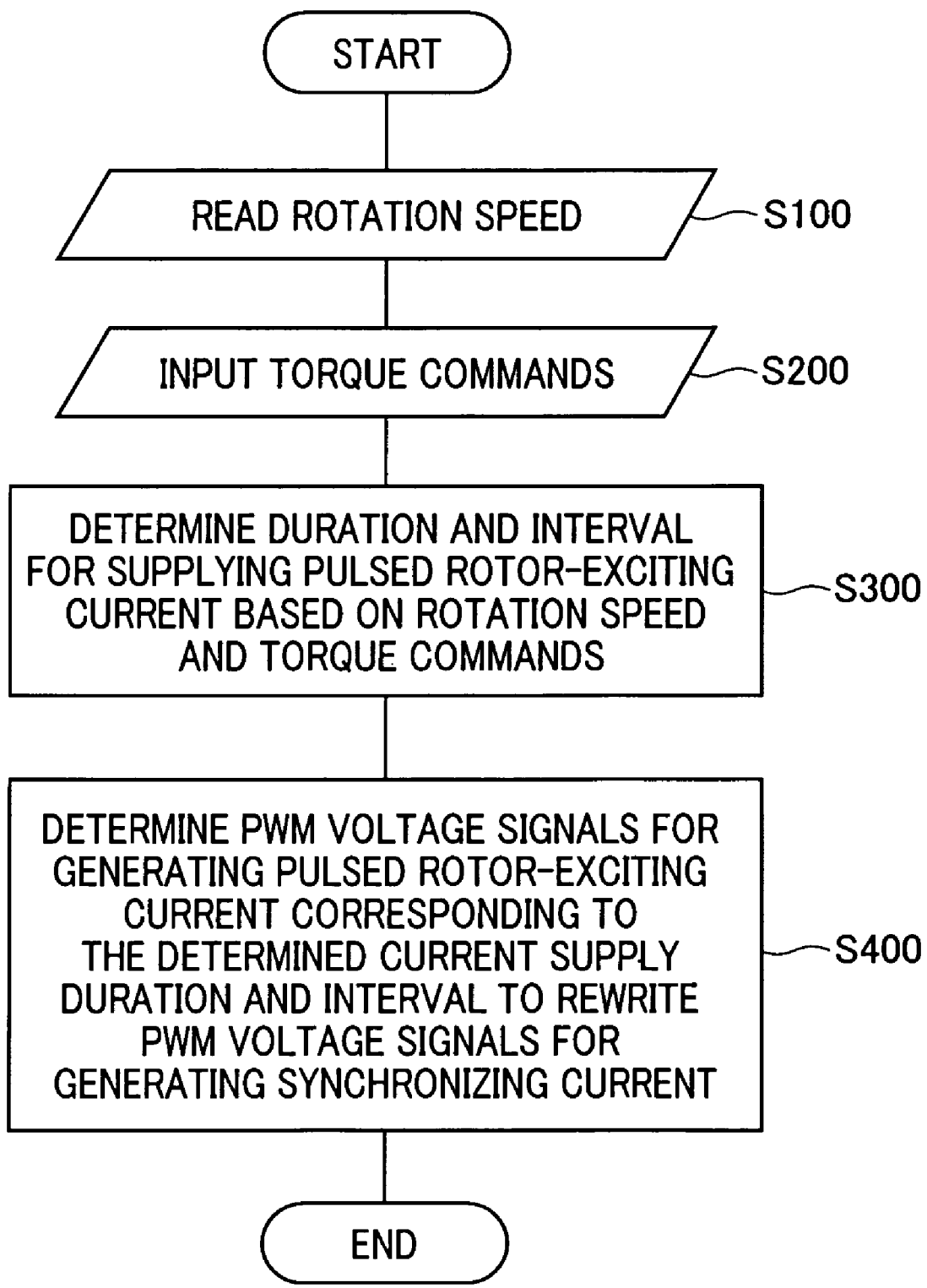
FIG. 34 is a flow diagram illustrating control for generating pulsed rotor-exciting current according to the rate of rotations and torque commands.

Referring now to the flow diagram of FIG. 34, hereinafter is explained an example of the control effected by the controller 40, for superposing the pulsed rotor-exciting current based on the findings described above.

First, the rate of rotations and torque commands are read (steps S100 and S200). Then, a period and interval (frequency) for supplying the pulsed rotor-exciting current are determined based on the read-out number of rotations and the torque commands (step S300). This determination utilizes a map storing a relationship between the numbers of rotations, torque commands, the periods and intervals (frequencies) for supplying the pulsed rotor-exciting current.

Then, a PWM voltage signal is generated to generate the pulsed rotor-exciting current having the determined period and interval (frequency) of current supply. Then, among PWM voltage signals for generating synchronizing current for the individual phases, those signals in a portion superposing with the PWM voltage signals for generating pulsed rotor-exciting current, are replaced by the PWM voltage signals for generating pulsed rotor-exciting current (step S400). Replacement of the PWM voltage signals is carried out at the timing of a predetermined phase angle.

In this way, stable torque can be generated according to required torque values, irrespective of the change in the rate of rotations.

(Relationship between the Numbers of Rotations, Required Torque Values, Periods and Intervals (Frequencies) for Supplying Pulsed Rotor-Exciting Current)

Hereinafter is explained a relationship between the numbers of rotations, the periods and the intervals (frequencies) for supplying pulsed rotor-exciting current, which are written in the map. It should be appreciated that required torque values are substantially in proportion to average values of substantially pulsed-formed rotor-exciting current. Therefore, the period and interval (frequency) for supplying pulsed rotor-exciting current may be determined first based on the rate of rotations. Then, the average value of pulsed rotor-exciting current having the determined period and interval (frequency) may be adjusted by a required torque value. As described above, supply of the pulsed rotor-exciting current in the positive direction is performed in a phase-sequential manner.

First, if the rate of rotations exceeds a predetermined threshold (if one cycle of synchronizing current is shorter than a predetermined threshold time), the number of times for supplying the pulsed rotor-exciting current per cycle of synchronizing current is reduced.

In contrast, if the rate of rotations is less than a predetermined threshold (i.e., if one cycle of synchronizing current is longer than a predetermined threshold time), the pulsed rotor-exciting current is supplied a specified plurality of times per cycle of synchronizing current.

Also, the duration of time for supplying the pulsed rotor-exciting current is shortened with the increase in the rate of rotations, and the duration of time is prolonged with the decrease in the rate of rotations, within a range of not changing the number of times for supplying the pulsed rotor-exciting current per cycle of synchronizing current.

Torque fluctuates in the vicinity of the period when the frequency of supplying the pulsed rotor-exciting current is changed in response to the change in the rate of rotations, because the average value of the pulsed rotor-exciting current is change. This torque fluctuation is caused out by adjusting the period for supplying the pulsed rotor-exciting current, in the vicinity of the period when the frequency of supplying the pulsed rotor-exciting current is changed.

Also, supply of the pulsed rotor-exciting current in the positive direction is performed in a phase-sequential manner. Thus, the pulsed rotor-exciting current of a specific direction will not be concentrated on the synchronizing current of one phase, whereby the unbalance or offset of the three-phase armature current can be mitigated.

Also, while the pulsed rotor-exciting current is supplied in a phase-sequential manner, the direction of supplying the pulsed rotor-exciting current in each phase is reversed every time the current is supplied. In this way, the unbalance or offset of the armature current, i.e. the phase current, can be well mitigated.

Also, the cycle of supplying the pulsed rotor-exciting current is maintained to fall within a certain period of time. For example, the certain period of time to be maintained may correspond to 10 to 90%, or desirably 20 to 80%, of one carrier cycle of the PWM voltage for forming synchronizing current. Thus, the torque strain can be mitigated.

Also, one supply of the pulsed rotor-exciting current is carried out within one carrier cycle of the PWM voltage for generating synchronizing current. Thus, the adjustment of the pulse width of one carrier cycle of the PWM voltage can adjust the pulsed rotor-exciting current to thereby prominently simplify the circuit configuration. Further, as has already been described, this adjustment will not permit the PWM voltage for forming pulsed rotor-exciting current to temporally superpose on the PWM voltage for forming synchronizing current. Thus, the waveform of the synchronizing current can be prevented from being distorted.

Hereinafter is explained an influence of the change in the rate of is rotations on torque.

With the change in the rate of rotations, the duration of field current peak variation in a certain period of time relatively changes. For example, the time required for one cycle of synchronizing current is shortened at the time of high-speed rotation. The field current peak variation will occur a predetermined number of times in one cycle of synchronizing current. Accordingly, the influence of the field peak variation is increased at the time of high-speed rotation.

This problem can be resolved by reducing the frequency of supplying the pulsed rotor-exciting current, or in other words, by thinning the pulsed rotor-exciting current, at the time of high-speed rotation. At the time of low-speed rotation, on the other hand, this problem can be resolved by increasing the frequency of supplying the pulsed rotor-exciting current, or in other words, by increasing the rate of times of supplying the pulsed rotor-exciting current per cycle of synchronizing current.

Further, with the change in the rate of rotations, the interval of supplying the pulsed rotor-exciting current changes. Accordingly, one cycle of field current is shortened at the time of high-speed rotation, so that attenuation in the one cycle can be reduced. This will also reduce field current ripple.

Further, with the increase in the rate of rotations, the interval of the pulsed rotor-exciting current is shortened. This means an increase in the average value of the pulsed rotor-exciting current per certain period of time, and thus means increase of torque. Accordingly, in order to generate field current corresponding to required torque, it is necessary to adjust the frequency or duration of time for supplying the pulsed rotor-exciting current, according to the rate of rotations.

(Modifications)

The description in the embodiment described above has dealt with the superposition of the pulsed rotor-exciting current on the motor current as synchronizing current. However, the pulsed rotor-exciting current can also be similarly superposed on the generated current as synchronizing current.

In the description provided above, the synchronous rotary electric machine has been dealt with as an apparatus. However, the present invention may also be taken as a method for controlling duration or frequency of supplying pulsed rotor-exciting current.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A synchronous rotary electric machine, comprising:
a stator in which a plurality of phases of armature windings are wound;
a rotor having a rotor core in which a field winding is wound and being placed to face the stator for rotation;
a current limiting element connected in series to the field winding to limit, to one direction, a flow direction of induction AC (alternating current) current induced through the field winding in response to armature current passing through the armature windings so that the field winding is allowed to pass a field current therethrough along only the one direction; and
a current control circuit that comprises
means for supplying to the armature windings a fundamental component of the armature current which corresponds to a synchronizing current for producing a rotating magnetic field rotating in sync with the rotation of the rotor and adjusting a frequency of the synchronizing current to change a rotation speed of the rotor,
means for supplying to the armature windings a pulsed rotor exciting current for causing the field winding to induce the field current therethrough only during a specified current-supply duration which is set to be shorter than one cycle of the synchronizing current, and
means for setting the number of times of current supply for the pulsed rotor exciting current, per electrical angle of $2\pi$ of the rotor and per phase, so as to have a positive correlation with the cycle of the synchronizing current.

2. The synchronous rotary electric machine according to claim 1, wherein the current control circuit comprises
means for suppressing changes in an average of the field current, which are caused by changes in a duration of the synchronizing current per one cycle, by adjusting the current-supply duration for the pulsed rotor exciting current, when changes in the rotation speed of the rotor are below a predetermined threshold.

3. The synchronous rotary electric machine according to claim 1, wherein the current control circuit comprises means for reducing the number of times of the current supply for the pulsed rotor exciting current, per electrical angle of $2\pi \times n$ of the rotor and per phase, to an amount less than n-times when the rotation speed of the rotor exceeds a predetermined threshold wherein n is a positive integer of 2 or more and m is the number of phases and not equal to n.

4. The synchronous rotary electric machine according to claim 1, wherein the current control circuit comprises means for setting the number of times of the current supply for the pulsed rotor exciting current, per electrical angle of $2\pi \times n$ of the rotor and per phase, to two times or more, when the rotation speed of the rotor is less than a predetermined threshold.

5. The synchronous rotary electric machine according to claim 1, wherein the current control circuit comprises means for performing the current supply of the pulsed rotor exciting current in a positive direction thereof in sequence phase by phase.

6. The synchronous rotary electric machine according to claim 1, wherein the current control circuit comprises means for performing the current supply of the pulsed rotor exciting current in sequence phase by phase and reversing a current supply direction of the pulsed rotor exciting current to be supplied to each phase every current supply.

7. The synchronous rotary electric machine according to claim 1, wherein the current control circuit comprises means for controlling a current supply cycle of the pulsed rotor exciting current within a specified time period.

8. The synchronous rotary electric machine according to claim 1, wherein the current control circuit comprises means for performing one time of current supply of the pulsed rotor exciting current within a time period defined by a cycle of a carrier signal of a PWM voltage for generating the synchronizing current.

9. A synchronous rotary electric machine, comprising:
a stator in which a plurality of phases of armature windings are wound;
a rotor having a rotor core in which a field winding is wound and being placed to face the stator for rotation;
a current limiting element connected in series to the field winding to limit, to one direction, a flow direction of induction AC (alternating current) current induced through the field winding in response to armature current passing through the armature windings so that the field winding is allowed to pass a field current therethrough along only the one direction; and
a current control circuit that comprises
means for supplying to the armature windings a fundamental component of the armature current which corresponds a synchronizing current for producing a rotating magnetic field rotating in sync with the rotation of the rotor and adjusting a frequency of the synchronizing current to change a rotation speed of the rotor,
means for supplying to the armature windings a pulsed rotor exciting current for causing the field winding to induce the field current therethrough only during a current-supply duration which is set to be shorter than one cycle of the synchronizing current, and
means for adjusting one time of the current-supply duration for the pulsed rotor exciting current, per electrical angle of $2\pi$ of the rotor and per phase, so as to have a negative correlation to the rotation speed of the rotor.

10. The synchronous rotary electric machine according to claim 9, wherein the current control circuit comprises means for reducing the number of times of the current supply for the pulsed rotor exciting current, per electrical angle of $2\pi \times n$ of the rotor and per phase, to an amount less than n-times when the rotation speed of the rotor exceeds a predetermined threshold wherein n is a positive integer of 2 or more and m is the number of phases and not equal to n.

11. The synchronous rotary electric machine according to claim 9, wherein the current control circuit comprises means for setting the number of times of the current supply for the pulsed rotor exciting current, per electrical angle of $2\pi \times n$ of the rotor and per phase, to two times or more, when the rotation speed of the rotor is less than a predetermined threshold.

* * * * *